United States Patent
Hohlfeld et al.

(10) Patent No.: US 9,100,403 B2
(45) Date of Patent: *Aug. 4, 2015

(54) APPARATUS AND METHODS FOR PROVIDING AUTHORIZED DEVICE ACCESS

(71) Applicant: QUALCOMM Incorporated, San Diego, CA (US)

(72) Inventors: Matthew W. Hohlfeld, San Diego, CA (US); Laurence G. Lundblade, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/960,781

(22) Filed: Aug. 6, 2013

(65) Prior Publication Data

US 2013/0326596 A1 Dec. 5, 2013

Related U.S. Application Data

(63) Continuation of application No. 12/641,305, filed on Dec. 17, 2009, now Pat. No. 8,505,078.

(60) Provisional application No. 61/140,969, filed on Dec. 28, 2008.

(51) Int. Cl.
*G06F 21/00* (2013.01)
*H04L 29/06* (2006.01)
(Continued)

(52) U.S. Cl.
CPC ............ *H04L 63/10* (2013.01); *G06F 21/6218* (2013.01); *H04L 9/321* (2013.01);
(Continued)

(58) Field of Classification Search
CPC ............................... H04L 63/101; H04L 9/32
USPC ..................... 713/176, 170; 726/5
See application file for complete search history.

(56) References Cited

U.S. PATENT DOCUMENTS

| 5,943,423 | A | 8/1999 | Muftic |
| 7,010,690 | B1 | 3/2006 | Hanna et al. |

(Continued)

FOREIGN PATENT DOCUMENTS

| JP | H1125045 A | 1/1999 |
| JP | 2002032344 A | 1/2002 |

(Continued)

OTHER PUBLICATIONS

BTIL: Brew MP Developer, https://developer.brewmp.com/resources/tech-guides/connect-technology-guide/connect-implementations/btil, p. 1 and 2, 2013.

(Continued)

*Primary Examiner* — Harunur Rashid
*Assistant Examiner* — Angela Holmes
(74) *Attorney, Agent, or Firm* — Shirin Tefagh

(57) ABSTRACT

Methods, apparatus, and systems are described for providing an accessor device an access credential to interact with a device resource on an accessee device. An authorization entity having a trust relationship with the accessee device, or a linked subordinate authorization entity, generates the access credential. The access credential includes a modification detection indicator, at least one access privilege, and an accessor public key. The at least one access privilege corresponds to at least one device resource on the accessee device. The authorization entity forwards the access credential to the accessor device, which presents the access credential to the accessee device for authentication. Once authenticated, the accessee device grants access to one or more device resources, and controls requests to insure they are within the scope of the at least one access privilege.

37 Claims, 12 Drawing Sheets

(51) Int. Cl.
  *G06F 21/62* (2013.01)
  *H04W 12/08* (2009.01)
  *H04L 9/32* (2006.01)

(52) U.S. Cl.
  CPC ............ *H04L 9/3247* (2013.01); *H04W 12/08* (2013.01); *H04L 9/32* (2013.01); *H04L 63/08* (2013.01); *H04L 63/101* (2013.01); *H04L 2209/38* (2013.01); *H04L 2209/603* (2013.01); *H04L 2209/80* (2013.01)

(56) References Cited

U.S. PATENT DOCUMENTS

| | | |
|---|---|---|
| 8,505,078 B2 | 8/2013 | Hohlfeld et al. |
| 2004/0073801 A1 | 4/2004 | Kalogridis et al. |
| 2005/0097330 A1 | 5/2005 | Lundblade |
| 2006/0107327 A1 | 5/2006 | Sprigg et al. |
| 2010/0070760 A1 | 3/2010 | Vanderveen et al. |

FOREIGN PATENT DOCUMENTS

| | | |
|---|---|---|
| JP | 2003273860 A | 9/2003 |
| JP | 2004348631 A | 12/2004 |
| JP | 2005509366 A | 4/2005 |
| JP | 2007226470 A | 9/2007 |
| WO | WO-03041338 A1 | 5/2003 |
| WO | 2005043334 A2 | 5/2005 |
| WO | WO-2006055544 | 5/2006 |
| WO | 2008111494 A1 | 9/2008 |

OTHER PUBLICATIONS

International Search Report and Written Opinion—PCT/US2009/069126—ISA/EPO—Apr. 8, 2010.

Kerberos (protocol), From Wikipedia, the free encyclopedia, http://en.wikipedia.org/wiki/Kerberos_(protocol) #Client_Service_Authorization, p. 1-p. 5, 2013.

APPARATUS AND METHODS FOR PROVIDING AUTHORIZED DEVICE ACCESS

CROSS-REFERENCE TO RELATED APPLICATIONS

The present application is a continuation of U.S. patent application Ser. No. 12/641,305, entitled "APPARATUS AND METHODS FOR PROVIDING AUTHORIZED DEVICE ACCESS," filed Dec. 17, 2009, which claims priority to U.S. Provisional Patent Application Ser. No. 61/140,969, entitled "APPARATUS AND METHODS FOR PROVIDING AUTHORIZED DEVICE ACCESS," filed Dec. 28, 2008, which are both assigned to the assignee hereof and hereby expressly incorporated by reference in their entireties.

FIELD OF DISCLOSURE

The described aspects generally relate to access security on computing devices. More particularly, the described aspects relate to apparatus and methods of authorizing access to computing devices such that privileged actions may be performed only by authorized parties.

BACKGROUND

Advances in technology have resulted in smaller and more powerful personal computing devices. For example, there currently exist a variety of portable personal computing devices, including wireless computing devices, such as portable wireless telephones, personal digital assistants (PDAs) and paging devices, which are each small, lightweight, and can be easily carried by users. More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs.

In some cases, an entity such as a software developer operating a first computing device may desire access to applications and data residing on a second computing device. The device to be accessed may include protection mechanisms to control the access to its device resources. For example, protection mechanisms have included encryption protocols that provide only a simple all or nothing access to the device.

Other systems that provide secure communications between a client computing device and external devices are known to do so by, at least in part, having a secure credential installed on the client computing device at the time of manufacture. In one example, a service provider provides a secure credential to the manufacturer of the client computing device such that the manufacturer can install the secure credential during the manufacturing process.

In some systems, secure communication is provided, in part, by the installation or programming of phones by an authorized agent. Such programming can occur after the client computing devices have been manufactured and shipped. In one example, a secure credential is installed on the client computing device at the time and place of sale of the device. Here, in at least one example, an authorized agent inputs a code, from a list of unique secure codes, into the client computing device. In other instances, automated readers are used to transfer individual secure codes to each client computing device. This process avoids some of the difficulties associated with programming such client computing devices at the time of manufacture, such as adding a dynamic manufacturing step to a typically static process. However, this process still includes its own difficulties and vulnerabilities, including the problem of potential unauthorized access to the list of secure credentials that would allow unauthorized entities to spoof the identity of an otherwise authorized device.

Further, typical hard-wired or hard-coded approaches to using credentials require each client device be physically serviced by a service technician whenever a situation, such as a security breach, has occurred. Such a situation includes, for example, the need to replace, add, and/or otherwise update one or more credentials. The operational cost of a requirement to be physically serviced by a service technician is extremely high, particularly when large numbers of client devices are compromised.

More specifically, one such mechanism for authorizing privileged access to a device over serial connections includes the use of service programming codes (SPCs). Due to their lack of expressiveness, ease of illicit spread, and lack of traceability, SPCs are not well suited to controlling access with fine-grained or high-powered privileges.

Accordingly it would be advantageous to include many of the secure communication advantages inherent in general secure communications techniques, such as those associated with the use of secure credentials, while also avoiding other less advantageous aspects of such existing systems, such as the problems associated with storing cryptographic algorithms on wireless devices, requiring the installation of secure credentials at the time of manufacture or the programming of secure credentials at point-of-sale locations and the ability to update or replace these credentials in the event of a security breach.

SUMMARY

The described aspects include apparatus, methods, computer program products, and processors operable to provide an accessor device with access to restricted resources of an accessee device.

In an aspect, a method of gaining authorized access to a restricted resource on another device comprises receiving, at an accessor device, an access credential associated with an authorization entity having a direct or an indirect trust relationship with an accessee device. The access credential includes a modification detection indicator, at least one access privilege representation, and an accessor public key. The modification detection indicator is created by the authorization entity. Further, the method includes communicating the access credential, a proof of identity, and a request for interaction with at least one device resource on an accessee device. Additionally, the method includes receiving a result of an access authentication process that verifies an authenticity of the access credential based on the modification detection indicator, that verifies the proof of identity provided based on the accessor public key, and that verifies that the at least one access privilege representation in the access credential corresponds to a privilege to access the at least one device resource in the request for interaction. The result of the access authentication process comprises being granted or denied access to the at least one device resource.

In another aspect, at least one processor configured to gain authorized access to a restricted resource on another device comprises a first module for receiving an access credential associated with an authorization entity having a direct or an indirect trust relationship with an accessee device. The access credential includes a modification detection indicator, at least one access privilege representation, and an accessor public key. The modification detection indicator is created by the authorization entity. Further, the at least one processor includes a second module for communicating the access credential, a proof of identity, and a request for interaction with at least one device resource on an accessee device. Additionally, the at least one processor includes a third module for receiving a result of an access authentication process that verifies an authenticity of the access credential based on the modification detection indicator, that verifies the proof of identity provided based on the accessor public key, and that verifies that the at least one access privilege representation in the access credential corresponds to a privilege to access the at least one device resource in the request for interaction. The result of the access authentication process comprises being granted or denied access to the at least one device resource.

An additional aspect includes a computer program product comprising a computer-readable medium. The computer readable medium comprises at least one instruction operable to cause a computer to receive an access credential associated with an authorization entity having a direct or an indirect trust relationship with an accessee device, wherein the access credential includes a modification detection indicator, at least one access privilege representation, and an accessor public key. The modification detection indicator is created by the authorization entity. Further, the computer readable medium includes at least one instruction operable to cause the computer to communicate the access credential, a proof of identity, and a request for interaction with at least one device resource on the accessee device. Additionally, the computer readable medium includes at least one instruction operable to cause the computer to receive a result of an access authentication process that verifies an authenticity of the access credential based on the modification detection indicator, that verifies the proof of identity provided based on the accessor public key, and that verifies that the at least one access privilege representation in the access credential corresponds to a privilege to access the at least one device resource in the request for interaction. The result of the access authentication process comprises being granted or denied access to the at least one device resource.

A further aspect includes a communication device comprising means for receiving an access credential associated with an authorization entity having a direct or an indirect trust relationship with an accessee device. The access credential includes a modification detection indicator, at least one access privilege representation, and an accessor public key, wherein the modification detection indicator was created by the authorization entity. Further, the communication device includes means for communicating the access credential, a proof of identity, and a request for interaction with at least one device resource on the accessee device. Additionally, the communication device includes means for receiving a result of an access authentication process that verifies an authenticity of the access credential based on the modification detection indicator, that verifies the proof of identity provided based on the accessor public key, and that verifies that the at least one access privilege representation in the access credential corresponds to a privilege to access the at least one device resource in the request for interaction. The result of the access authentication process comprises being granted or denied access to the at least one device resource.

In another aspect, an accessor device for accessing resources on an accessee device comprises a processor and a memory in communication with the processor. The accessor device further includes an access module stored in the memory and executable by the processor. The access module is operable to receive an access credential associated with an authorization entity having a direct or an indirect trust relationship with an accessee device, wherein the access credential includes a modification detection indicator, at least one access privilege representation, and an accessor public key, wherein the modification detection indicator was created by the authorization entity. The access module is further operable to initiate communication of the access credential, a proof of identity, and a request for interaction with at least one device resource on the accessee device. Additionally, the access module is further operable to receive a result of an access authentication process that verifies an authenticity of the access credential based on the modification detection indicator, that verifies the proof of identity provided based on the accessor public key, and that verifies that the at least one access privilege representation in the access credential corresponds to a privilege to access the at least one device resource in the request for interaction, wherein the result of the access authentication process comprises being granted or denied access to the at least one device resource.

In an aspect, a method of providing access to device resources on an accessee device comprises receiving an access credential corresponding to an accessor device, a proof of identity, and a request for interaction with at least one device resource on the accessee device, wherein the access credential is associated with an authorization entity having a direct or an indirect trust relationship with the accessee device, and wherein the access credential includes a modification detection indicator, at least one access privilege representation, and an accessor public key, wherein the modification detection indicator was created by the authorization entity. The method further includes executing an access authentication process that verifies an authenticity of the access credential based on the modification detection indicator, that verifies the proof of identity provided based on the accessor public key, and that verifies that the at least one access privilege representation in the access credential corresponds to a privilege to access the at least one device resource in the request for interaction. Additionally, the method includes transmitting a result of the access authentication process, wherein the result of the access authentication process comprises a grant or a denial of access to the at least one device resource.

In a further aspect, at least one processor configured to provide access to device resources comprises a first module, a second module, and a third module. The first module is for receiving an access credential corresponding to an accessor device, a proof of identity, and a request for interaction with at least one device resource on the accessee device, wherein the access credential is associated with an authorization entity having a direct or an indirect trust relationship with the accessee device, and wherein the access credential includes a modification detection indicator, at least one access privilege representation, and an accessor public key, wherein the modification detection indicator was created by the authorization entity. The second module is for executing an access authentication process that verifies an authenticity of the access credential based on the modification detection indicator, that verifies the proof of identity provided based on the accessor public key, and that verifies that the at least one access privilege representation in the access credential corresponds to a privilege to access the at least one device resource in the request for interaction. The third module is for transmitting a result of the access authentication process, wherein the result of the access authentication process comprises a grant or a denial of access to the at least one device resource.

In yet another aspect, a computer program product comprises a computer-readable medium. The computer readable medium comprises at least one instruction for causing a computer to receive an access credential corresponding to an accessor device, a proof of identity, and a request for interaction with at least one device resource on the accessee device, wherein the access credential is associated with an authorization entity having a direct or an indirect trust relationship with the accessee device, and wherein the access credential includes a modification detection indicator, at least one access privilege representation, and an accessor public key, wherein the modification detection indicator was created by the authorization entity. Further, the computer readable medium comprises at least one instruction for causing the computer to execute an access authentication process that verifies an authenticity of the access credential based on the modification detection indicator, that verifies the proof of identity provided based on the accessor public key, and that verifies that the at least one access privilege representation in the access credential corresponds to a privilege to access the at least one device resource in the request for interaction. Additionally, the computer readable medium comprises at least one instruction for causing the computer to transmit a result of the access authentication process, wherein the result of the access authentication process comprises a grant or a denial of access to the at least one device resource.

In another aspect, a communication device comprises means for receiving an access credential corresponding to an accessor device, a proof of identity, and a request for interaction with at least one device resource on the accessee device, wherein the access credential is associated with an authorization entity having a direct or an indirect trust relationship with the accessee device, and wherein the access credential includes a modification detection indicator, at least one access privilege representation, and an accessor public key, wherein the modification detection indicator was created by the authorization entity. Further, the communication device comprises means for executing an access authentication process that verifies an authenticity of the access credential based on the modification detection indicator, that verifies the proof of identity provided based on the accessor public key, and that verifies that the at least one access privilege representation in the access credential corresponds to a privilege to access the at least one device resource in the request for interaction. Additionally, the communication device comprises means for transmitting a result of the access authentication process, wherein the result of the access authentication process comprises a grant or a denial of access to the at least one device resource.

A further aspect includes an accessee device for providing access to resources. The accessee device comprises a processor, at least one device resource in communication with the processor, and a memory in communication with the processor. Additionally, the accessee device includes an access authorization module stored in the memory and executable by the processor, wherein the access authorization module comprises an access authorization process. The access authorization module is operable to receive an access credential corresponding to an accessor device, a proof of identity, and a request for interaction with at least one device resource on the accessee device, wherein the access credential is associated with an authorization entity having a direct or an indirect trust relationship with the accessee device, and wherein the access credential includes a modification detection indicator, at least one access privilege representation, and an accessor public key, wherein the modification detection indicator was created by the authorization entity. Further, the access authorization module is operable to execute the access authentication process that verifies an authenticity of the access credential based on the modification detection indicator, that verifies the proof of identity provided based on the accessor public key, and that verifies that the at least one access privilege representation in the access credential corresponds to a privilege to access the at least one device resource in the request for interaction. Additionally, the access authorization module is operable to transmit a result of the access authentication process, wherein the result of the access authentication process comprises a grant or a denial of access to the at least one device resource.

In another aspect, a method for authorizing an accessor device to interact with resources on an accessee device comprises generating an access credential associated with an authorization entity having a direct or an indirect trust relationship with an accessee device, wherein the access credential includes a modification detection indicator, at least one access privilege representation, and an accessor public key, wherein the modification detection indicator was created by the authorization entity. Additionally, the method includes communicating the access credential, wherein the access credential is operable to authorize the accessor device to the accessee device and allow interaction with at least one device resource on the accessee device in accordance with the at least one access privilege representation based on an access authentication process executed by the accessee device that verifies an authenticity of the access credential based on the modification detection indicator, that verifies a proof of identity of the accessor device based on the accessor public key, and that verifies that the at least one access privilege representation in the access credential corresponds to a privilege to access the at least one device resource in the request for interaction. The result of the access authentication process comprises being granted or denied access to the at least one device resource.

Further, in an aspect, at least one processor configured to authorize an accessor device to interact with resources on an accessee device comprises a first module and a second module. The first module is for generating an access credential associated with an authorization entity having a direct or an indirect trust relationship with an accessee device, wherein the access credential includes a modification detection indicator, at least one access privilege representation, and an accessor public key, wherein the modification detection indicator was created by the authorization entity. The second module is for communicating the access credential, wherein the access credential is operable to authorize the accessor device to the accessee device and allow interaction with at least one device resource on the accessee device in accordance with the at least one access privilege representation based on an access authentication process executed by the accessee device that verifies an authenticity of the access credential based on the modification detection indicator, that verifies a proof of identity of the accessor device based on the accessor public key, and that verifies that the at least one access privilege representation in the access credential corresponds to a privilege to access the at least one device resource in the request for interaction. The result of the access authentication process comprises being granted or denied access to the at least one device resource.

In another aspect, a computer program product comprises a computer-readable medium. The computer readable medium includes at least one instruction for causing a computer to generate an access credential associated with an authorization entity having a direct or an indirect trust relationship with an accessee device, wherein the access credential includes a modification detection indicator, at least one access privilege representation, and an accessor public key, wherein the modification detection indicator was created by the authorization entity. Additionally, the computer readable medium includes at least one instruction for causing a computer to communicate the access credential, wherein the access credential is operable to authorize the accessor device to the accessee device and allow interaction with at least one device resource on the accessee device in accordance with the at least one access privilege representation based on an access authentication process executed by the accessee device that verifies an authenticity of the access credential based on the modification detection indicator, that verifies a proof of identity of the accessor device based on the accessor public key, and that verifies that the at least one access privilege representation in the access credential corresponds to a privilege to access the at least one device resource in the request for interaction. The result of the access authentication process comprises being granted or denied access to the at least one device resource.

In a further aspect, an authorization device comprises means for generating an access credential associated with an authorization entity having a direct or an indirect trust relationship with an accessee device, wherein the access credential includes a modification detection indicator, at least one access privilege representation, and an accessor public key, wherein the modification detection indicator was created by the authorization entity. Additionally, the authorization device includes means for communicating the access credential, wherein the access credential is operable to authorize the accessor device to the accessee device and allow interaction with at least one device resource on the accessee device in accordance with the at least one access privilege representation based on an access authentication process executed by the accessee device that verifies an authenticity of the access credential based on the modification detection indicator, that verifies a proof of identity of the accessor device based on the accessor public key, and that verifies that the at least one access privilege representation in the access credential corresponds to a privilege to access the at least one device resource in the request for interaction. The result of the access authentication process comprises being granted or denied access to the at least one device resource.

Additionally, in another aspect, a device for authorizing an accessor device to access resources on an accessee device comprises a processor, a memory in communication with the processor, a credential management module, and a communication module. The credential management module is stored in the memory and is executable by the processor, and includes a privilege establishment module operable to generate an access credential associated with an authorization entity having a direct or an indirect trust relationship with an accessee device. The access credential includes a modification detection indicator, at least one access privilege representation, and an accessor public key. The modification detection indicator was created by the authorization entity. Additionally, the communication module is in communication with the processor and operable to communicate the access credential. The access credential is operable to authorize the accessor device to the accessee device and allow interaction with at least one device resource on the accessee device in accordance with the at least one access privilege representation based on an access authentication process executed by the accessee device that verifies an authenticity of the access credential based on the modification detection indicator, that verifies a proof of identity of the accessor device based on the accessor public key, and that verifies that the at least one access privilege representation in the access credential corresponds to a privilege to access the at least one device resource in the request for interaction. The result of the access authentication process comprises being granted or denied access to the at least one device resource.

In another aspect, a method of gaining authorized access to a restricted resource on another device comprises receiving, at an accessor device, an access credential identifier of an access credential associated with an authorization entity having a direct or an indirect trust relationship with an accessee device. The method further includes communicating the access credential identifier, a proof of identity, and a request for interaction with at least one device resource on an accessee device. Additionally, the method includes receiving a result of an access authentication process that verifies an authenticity of the access credential based on a corresponding modification detection indicator, that verifies the proof of identity provided based on a corresponding accessor public key, and that verifies that at least one access privilege representation in the access credential corresponds to a privilege to access the at least one device resource in the request for interaction, wherein the result of the access authentication process comprises being granted or denied access to the at least one device resource.

In a further aspect, at least one processor configured to enable an accessor device to gain authorized access to a restricted resource on another device comprises a first module for receiving an access credential identifier of an access credential associated with an authorization entity having a direct or an indirect trust relationship with an accessee device. The at least one processor further includes a second module for communicating the access credential identifier, a proof of identity, and a request for interaction with at least one device resource on an accessee device. Additionally, the at least one processor includes a third module for receiving a result of an access authentication process that verifies an authenticity of the access credential based on a modification detection indicator, that verifies the proof of identity provided based on an accessor public key, and that verifies that at least one access privilege representation in the access credential corresponds to a privilege to access the at least one device resource in the request for interaction, wherein the result of the access authentication process comprises being granted or denied access to the at least one device resource.

In another aspect, a computer program product comprises a computer-readable medium having a plurality of instructions. The instructions include at least one instruction operable to cause a computer to receive an access credential identifier of an access credential associated with an authorization entity having a direct or an indirect trust relationship with an accessee device. Further, the instructions include at least one instruction operable to cause the computer to communicate the access credential identifier, a proof of identity, and a request for interaction with at least one device resource on an accessee device. Additionally, the instructions include at least one instruction operable to cause the computer to receive a result of an access authentication that verifies an authenticity of the access credential based on a modification detection indicator, that verifies the proof of identity provided based on an accessor public key, and that verifies that at least one access privilege representation in the access credential corresponds to a privilege to access the at least one device resource in the request for interaction, wherein the result of the access authentication process comprises being granted or denied access to the at least one device resource.

In a further aspect, a communication device comprises means for receiving an access credential identifier of an access credential associated with an authorization entity having a direct or an indirect trust relationship with an accessee device. Further, the communication device includes means for communicating the access credential identifier, a proof of identity, and a request for interaction with at least one device resource on the accessee device. Additionally, the communication device includes means for receiving a result of an access authentication process that verifies an authenticity of the access credential based on a modification detection indicator, that verifies the proof of identity provided based on an accessor public key, and that verifies that at least one access privilege representation in the access credential corresponds to a privilege to access the at least one device resource in the request for interaction, wherein the result of the access authentication process comprises being granted or denied access to the at least one device resource.

In an aspect, an accessor device for accessing resources on an accessee device comprises a processor, a memory in communication with the processor, and an access module stored in the memory and executable by the processor. The access module is operable to receive an access credential identifier of an access credential associated with an authorization entity having a direct or an indirect trust relationship with an accessee device. Further, the access module is operable to initiate communication of the access credential identifier, a proof of identity, and a request for interaction with at least one device resource on the accessee device. Additionally, the access module is operable to receive a result of an access authentication process that verifies an authenticity of the access credential based on a modification detection indicator, that verifies the proof of identity provided based on an accessor public key, and that verifies that at least one access privilege representation in the access credential corresponds to a privilege to access the at least one device resource in the request for interaction, wherein the result of the access authentication process comprises being granted or denied access to the at least one device resource.

Other aspects, advantages, and features of the described aspects will become apparent after review of the entire application.

BRIEF DESCRIPTION OF THE DRAWINGS

The foregoing aspects and the attendant advantages of the aspects described herein will become more readily apparent by reference to the following detailed description when taken in conjunction with the accompanying drawings wherein:

FIG. 2 is a schematic diagram of one aspect of a plurality of levels of delegation of privileges, including a master authorization entity granting credentials to one or more subordinate entities, wherein each subordinate entity may likewise grant credentials to a lower level of one or more subordinate entities, and so on;

DETAILED DESCRIPTION

The following detailed description describes methods, apparatus, and computer-readable media used to authorize access to one or more predetermined resources on a computer device such that privileged actions may be performed on the accessed device. Unlike methods that may provide an all or nothing approach to granting privileges, the described aspects permit a trusted entity, or a subordinate entity having delegated authority from the trusted entity, to dynamically generate credentials having only those privileges necessary to perform a predetermined task without compromising other aspects of the device being accessed.

Figure 1:
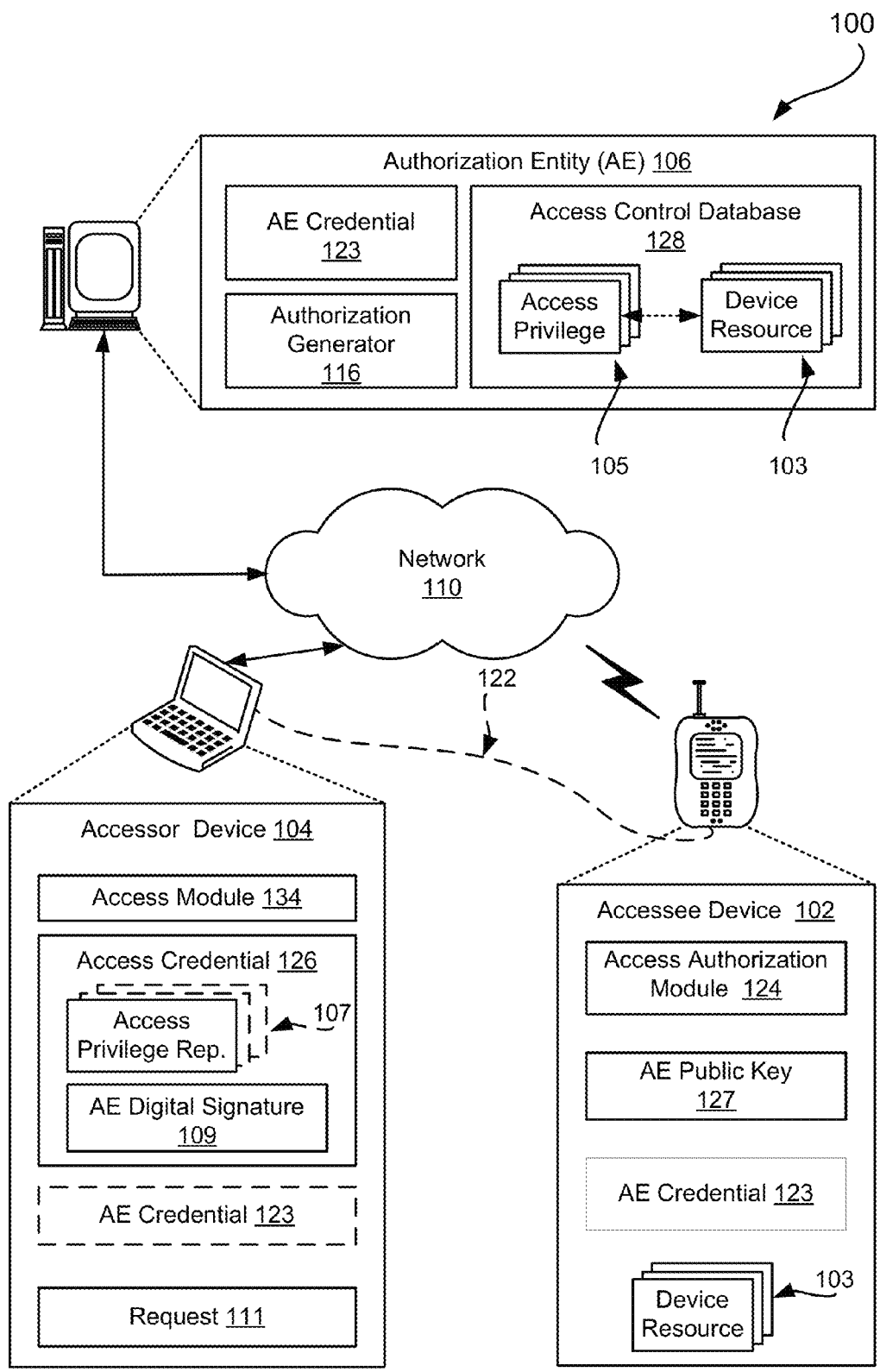
FIG. 1 is a high level diagram of one aspect of a system for providing authorized personnel with privileged access to a client computing device.

Referring to FIG. 1, in one aspect, a system 100 includes apparatus and methods for providing one device with authorized access to one or more resources of another device. For example, system 100 may include an accessor device 104 attempting to interact with one or more of a plurality of device resources 103 on an accessee device 102. As used herein, accessor device 104 refers to a device requesting access and/or interaction with another device, while accessee device 102 refers to the device receiving the access and/or interaction request. In typical operation, accessee device 102 prohibits or limits external access to the plurality of device resources 103 such that, without the present apparatus and methods, the plurality of device resources 103 would not be available to an external device such as accessor device 104.

For example, the plurality of device resources 103 may include, but are not limited to, one or any combination of: data and/or files and/or file systems, such as user input data including a contact name, a contact address, a contact phone and/or fax number, a content email address, a picture, an audio file, a video file, etc.; configuration information such as device-related configuration data, network-related configuration data, service programming codes (SPCs), a security policy, a virus scanner, a server address, etc.; services such as a voice call, a data call, a speaker, a microphone, a display, a position-location and/or geographical positioning system service, a debug or trouble-shooting service, access to predetermined communication ports, and any other service and/or application available on the respective device; and operating system level services, such as a process creation capability, a file system access, ability to launch and run applications, etc.

In some cases, for example, device resources 103 may not be accessible to an owner of accessee device 102, but only to authorized personnel. Examples of such limited access device resources 103 may include, but are not limited to, one or more of copyrighted content, device configuration settings, telemetry data, etc. There may be a need, however, to allow authorized personnel to access one or more device resources 103. For example, when an owner obtains a new device, a technician may be authorized to transfer copyrighted content from the old device to the new device of the user. In another example, a wireless device may have a subscriber identity module (SIM) locked to a given wireless network and/or to a given system configuration, but it may be desirable to allow an authorized technician to modify the setting or configuration while at the same time preventing the device owner from doing so. In yet another example, a wireless device may have network-related data and/or settings that a user may not be allowed to change, but that an authorized user such as a technician could be granted a limited privilege to access and verify and/or change. It should be noted that the present aspects are not limited to these scenarios, and that other similar use cases can exist.

Further, system 100 may include an authorization entity (AE) 106 having a trust relationship with either accessee device 102 and/or with one or more device resource 103. Authorization entity 106 may comprise or may be operable to generate a definition of one or more access privileges 105 associated with each one of a plurality of device resources 103, where each access privilege 105 enables access and interaction with at least one of the plurality of device resources 103. For example, one or more access privileges 105 may include, but are not limited to, debugging and/or performing device maintenance functions, such as provisioning and reconfiguration of a wireless device, managing an address book for synchronization utilities, file system access, uploading and/or downloading of content, e.g., pictures, music, ringers, etc., and transferring of data between devices. In some aspects, one or more of access privileges 105 may include an unknown future privilege, for example, the privilege may include code, and wherein determination of the definition of privileges associated with the code may be reserved for a later date. Further, for example, for each accessee device 102, AE 106 may store the relationship between each access privilege 105 and the corresponding one or more of the plurality of device resources 103 in an access control database 128. As such, access privileges 105 may be individual privileges, or may be part of a set of privileges, such as based on an organizational role, a status, a job title, etc. Additionally, it should be noted that AE 106 and each one of the plurality of device resources 103, or an operator associated with the respective resource, may have a predetermined agreement with respect to the definition of each access privilege 105, as well as to a policy on how to grant such privileges.

Further, AE 106 may include an authorization generator 116 operable to issue an access credential 126 to accessor device 104 to enable access to and interaction with one or more of the plurality of device resources 103 on accessee device 102. For example, access credential 126 may include one or more issued access privileges 107, for example, as determined by AE 106 based on an identity and/or purpose of accessor device 104, and an authorization entity (AE) digital signature 109, also referred to as a modification detection indicator, to prove the authenticity of authorization credential 126. In some aspects, for example, issued access privileges 107 may be selected from the available access privileges 105. In other aspects, issued access privileges 107 may be implicit privileges, as opposed to a tangible privilege included in the credential. For example, an implicit privilege may allow access to a respective device resource simply based on the possession of an access credential. Additionally, AE 106 and/or authorization generator 116 may forward AE credential 123 to accessor device 104 in order to allow accessor device 104 to prove that access privileges 107 in access credential 126 are within the allowable scope of privileges capable of being granted by AE 106.

It should be noted that system 100 may include a plurality of AEs 106, wherein each AE 106 is capable of having respective set of one or more access privileges 105 corresponding to one or more device resources 103. As such, in some cases, each AE 106 may be limited in scope as to the privileges it can grant with respect to one or more device resources 103 of accessee device 102.

Figure 2:
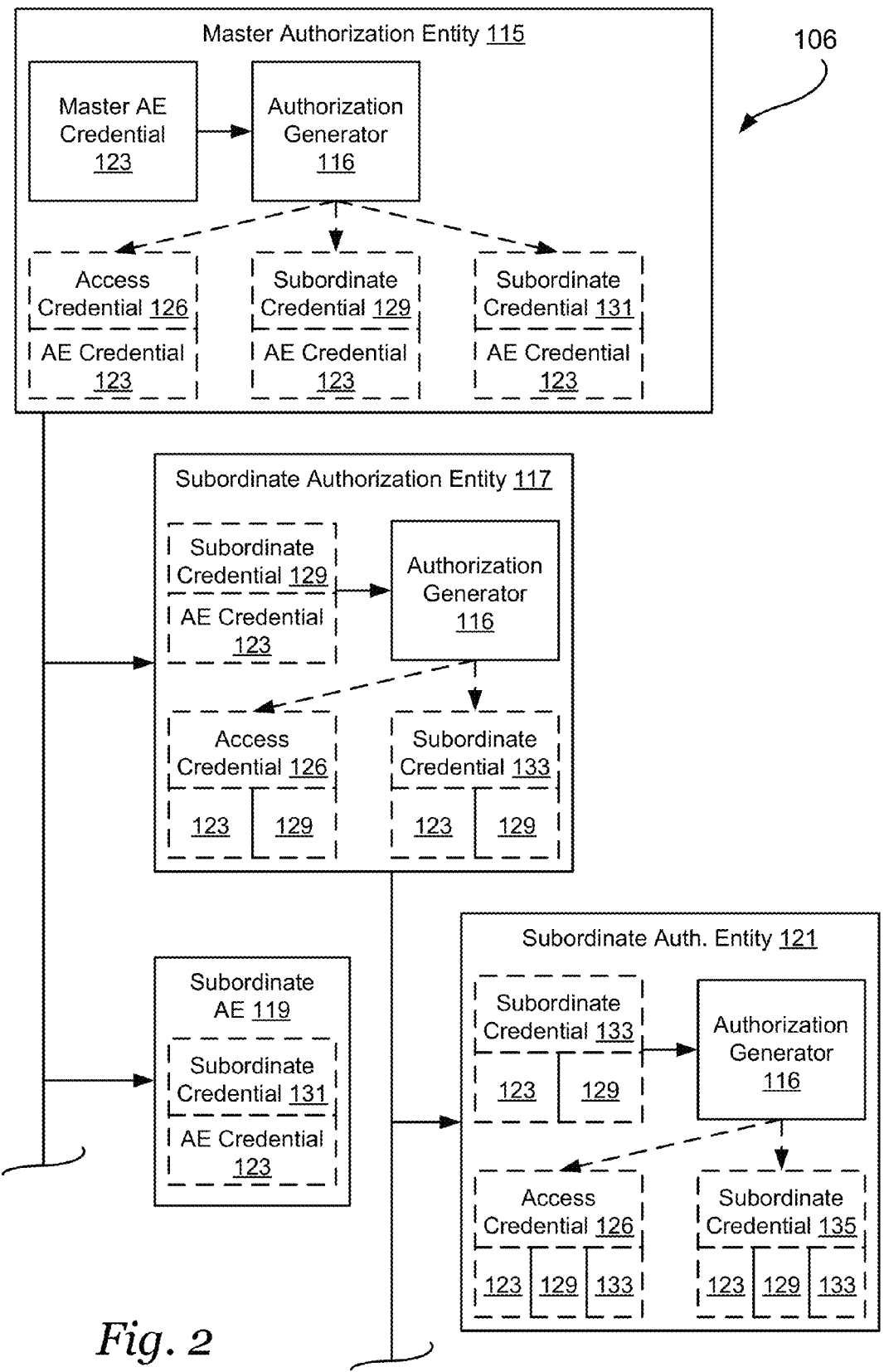

For example, referring to FIG. 2, in one aspect, AE 106 may comprise a plurality of entities, such as a master authorization entity (AE) 115 and one or more levels of one or more subordinate authorization entities, such as entities 117, 119 and 121. Further, master AE 115 includes a master credential 123 that enables authorization generator 116 in master AE 115 to generate one or more access credentials 126 for use by accessor device 104 (FIG. 1), and/or one or more subordinate credentials, such as 129 and 131, respectively for use by one or more subordinate authorization entities, such as subordinate AEs 117 and/or 119, located at a level below master AE 115. In this case, for example, subordinate AE 117 is granted subordinate credential 129 and subordinate AE 119 is granted subordinate credential 131. In some aspects, but not limited to these aspects, the privileges granted by each respective credential may overlap, or may be mutually exclusive, but are equal to or less than the authority and privileges available to master AE 115. Likewise, in some aspects, subordinate AEs 117 and 119 may further delegate privileges by granting their own respective access credentials and/or subordinate credentials based on the respective subordinate credential granted to them. As such, in some aspects, each successive subordinate credential comprises authority and privileges equal to or less than the authority and privileges included in the credential used to generate the respective subordinate credential. It should be noted that at any level of the hierarchy, the respective subordinate credentials may overlap with respect to privileges, or the respective subordinate credentials may provide unique sets of privileges. For example, in one use case, a cell phone chip manufacturer may grant multiple subordinate credentials each having separate sets of privileges based on an organizational function performed by each respective receiving entity. Thus, a system for delegation of privileges is established that allows any number of levels of dynamic privilege granting, wherein the privileges granted to a respective subordinate entity are equal to or less than the privileges available to the granting entity.

For example, master AE 115 may grant subordinate credential 129 to subordinate AE 117 and subordinate credential 131 to subordinate AE 119, where the authority and privileges in subordinate credentials 129 and 131 are equal to or less than the authority and privileges included in master credential 123. Likewise, for example, subordinate AE 117 may grant subordinate credential 133 to another delegate, e.g. subordinate AE 121, where the authority and privileges in subordinate credential 133 are equal to or less than the authority and privileges included in subordinate credential 129. It should be noted that each granting entity may grant any number of subordinate credentials.

Further, still referring to FIG. 2, the respective credential used in the generation and/granting of each subordinate credential may be passed to the respective subordinate entity, thereby providing proof of the validity of the respective subordinate credential, and proof that the scope of the privileges is valid, via a chain of one or more higher level credentials. In some aspects, the chain of credentials may not be included in a respective access credential, however, a reference thereto or indicator thereof may be included, or the system may provide a mechanism to discover the links back to the master authorization entity. For example, when master AE 115 grants subordinate credentials 129 and 131, the respective subordinate AEs 117 and 119 also receive master credential 123 from master AE 115 or from another device. Alternatively, master credential 123 may be loaded onto each subordinate AE, such as 117 and 119, at one time, such as during manufacture, and the respective subordinate credentials 129 and 131 may be provided at another time, such as a time when corresponding privileges are granted or requested. As such, credentials may be received at one time, or at different times. Similarly, when a delegate or subordinate entity issues a further subordinate credential, the receiving entity receives all of the credentials up to master credential 123. For example, when subordinate AE 121 grants subordinate credential 135, the receiving entity also receives: (1) subordinate credential 133 granted to subordinate AE 121; (2) subordinate credential 129 granted to subordinate AE 117, which granted subordinate credential 133; and (3) master credential 123 from master AE 115, which granted subordinate credential 129 to subordinate AE 117. As such, a chain of trust is provided based on the credentials. Similarly, when accessee credential 126 is granted by any subordinate entity, the respective chain of credentials is received by accessee device 102 (FIG. 1), thereby allowing accessee device 102 to verify the scope of the respective privileges, and to verify that the privileges were ultimately granted, in some cases via one or more levels of delegation, by a trusted party known to accessee device 102, e.g. master AE 115. Therefore, the present aspects allow for a very dynamic and multi-level credential and privilege generation and granting system, which provides for verifying the validity and scope of any issued credential and privileges.

Additionally, for example, any of the access credentials described above may be stored on a network device, and the granting of a credential to a device may be communicated to the device by providing the access credential identifier to the device receiving the grant, including information as to where the credential may be obtained or accessed. Accordingly, when using the access credential, a device may provide the respective access credential identifier to another device, which enables the receiving device to retrieve or otherwise access the respective access credential from the network location. For example, an access credential identifier may include one or more of: an access credential identifier of an individual access credential; a master authorization entity credential identifier corresponding to a master authorization entity credential; one or more subordinate credential identifiers corresponding to one or more subordinate credentials; and a chain identifier corresponding to a chain of credentials linking the access credential to the master authorization entity directly or through any number of other subordinate entities.

Thus, system 100 allows for specific access privileges 105 to be granted, and/or delegated, to specific AEs 106, thereby providing a manager of system 100 with the ability to dynamically control the generation of access credentials 126 within the system.

Referring back to FIG. 1, after receiving access credential 126 from AE 106, as well as after receiving or obtaining AE credential 123, such as via network 110 from AE 106, accessor device 104 executes an access module 134, which is operable to communicate with accessee device 102. For example, accessor device 104 may communicate with accessee device 102 through network 110 or through a local wired or wireless connection 122. In some aspects, for example, access module 134 presents access credential 126 and AE credential 123 to accessee device 102 in order to provide authorization to access predetermined ones of the plurality of device resources 103 based on the one or more issued access privileges 107. It should be noted, however, that AE credential 123 may be available from other sources, and it is not required for accessor device 104 to provide AE credential 123. In response, for example, accessee device 102 executes an access authorization module 124, which is operable to verify access credential 126, such as by validating AE digital signature 109 with access entity (AE) public key 127 (or a chain of signed credentials, such as may be signed by subordinate AEs, leading back to the master AE), and such as by validating the scope of access privileges 107, for example, via checking AE credential 123 to insure that access privileges 107 are equal to or less than the scope of privileges in AE credential 123. Verification of AE digital signature 109 and inspection of AE credential 123 allows accessee device 102 to trust the information included with access credential 126, as the verification process proves to accessee device 102 that AE 106 issued access credential 126 and therefore has authorized the one or more issued access privileges 107.

It should be noted that in some aspects, access authorization module 124 may not know and/or care what access privilege 107 is granted, as access authorization module 124 is primarily concerned with verifying that access credential 126 is authentic. As such, system 100 allows for the granting of privileges to be a very dynamic process, as access authorization module 124 does not need to be continually updated with new information with respect to which access privileges 105 are properly associated with which device resources 103.

If access credential 126 is not verified, then access authorization module 124 denies access to accessor device 104. If access credential 126 is verified, then access authorization module 124 allows access and interaction with a predetermined one or more of the plurality of device resources 103, wherein the respective device resource limits that interaction based on the one or more issued access privileges 107 included in access credential 126. In one aspect, for example, after verification, accessor device 104 is able to execute access module 126 to submit a request 111 to accessee device 102 for interaction with one or more of the plurality of device resources 103. In other aspects, request 111 may be presented at the same time as access credential 126. Upon receiving request 111, after verifying access credential 126 and verifying that request 111 falls within the granted privileges, accessee device 102 may execute the requested device resource based on the one or more issued access privileges 107 included within the verified access credential 126. Thus, if verified, access credential 126 provides accessor device 104 with authorized interaction with one or more of the plurality of device resources 103 according to the one or more issued access privileges 107.

Although respectively illustrated as a laptop computer and a cellular telephone, it should be noted that accessor device 104 and accessee device 102 may be any type of computer device. Further, it should be noted that authorization entity 106, accessor device 104 and accessee device 102 may be interconnected, although not necessarily simultaneously, through any type of communications link including network 110 and local connection 122, which may include a direct serial connection or a wireless connection.

Thus, system 100 provides a dynamic mechanism for allowing accessor device 104 to access and interact with accessee device 102 based on access credential 126 issued by AE 106. As such, while accessee device 102 may have no knowledge of and/or trust in accessor device 104, as could be the case when dealing with a subordinate AE (see FIG. 2), system 100 allows accessee device 102 to interact with one or more device resources 103 of accessor device 104 based on the trust of accessee device 102 in AE 106, verified through AE digital signature 109 and AE credential 123 (or chain of credentials). Further, access credential 126 may be dynamically created and advantageously may specifically identify selected ones of a plurality of access privileges 105 associated with specific ones of a plurality of device resources 103 authorized for access by AE 106 in order to limit access on an as-needed basis.

Figure 3:
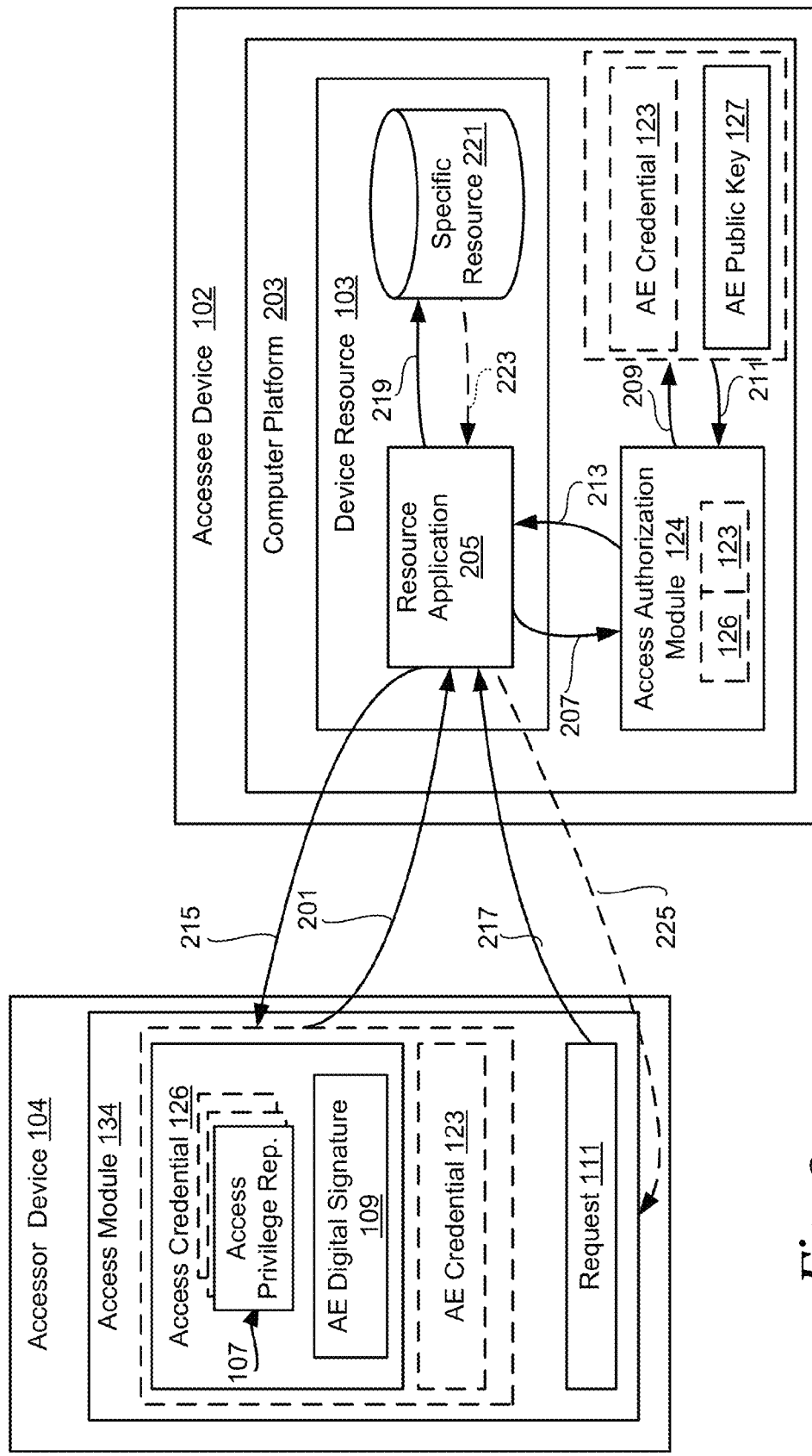
FIG. 3 is a schematic diagram of one aspect of the interaction between the accessor device and the accessee device relating to accessing one or more device resources on the accessee device.

Referring to FIG. 3, in one specific example of a procedure by which access to accessee device 102 may be obtained, at Event 201 accessor device 104 passes access credential 126 and AE credential 123 to device resource 103 in order to initiate interaction. As noted above, access credential 126 was previously requested from or otherwise provided by AE 106 (FIG. 1). Further, as noted above, accessee device 102 may obtain AE credential 123 from another source. Access credential 126 and AE credential 123 are received by computer platform 203 and forwarded to resource application 205. Before allowing interaction with device resource 103, at Event 207, resource application passes access credential 126 and AE credential 123 to access authorization module 124 in order to verify authenticity and scope of privileges. At Events 209 and 211, access authorization module 124 verifies AE digital signature 109 with AE public key 625, and verifies the scope of issued access privileges 107 with respect to AE credential 123. At Event 213, based on the verification check, access authorization module 124 returns a response verifying or denying the authenticity of access credential 126 and/or issued access privileges 107 to resource application 205. In turn, at Event 215, resource application 205 forwards a response indicating the result of the verification check to access module 134 of accessor device 104. At Event 217, if access credential 126 and issued access credentials 107 are verified, then in response access module 134 sends request 111 to resource application 205. As noted above, in some aspects, request 111 may be included in an initial communication along with access credential 126. In turn, at Event 219, resource application 205 passes request 111 or a reformatted representation or a portion of request 111 to specific resource 221 if request 111 comprises an action within the issued access privilege 107. Optionally, depending on the nature of request 111, at Events 223 and 225, a request response may be returned to access module 134 by specific resource 221 and resource application 205. For example, such a request response may comprise a verification that request 111 was performed and/or request response may comprise data associated with request 111. Thus, accessee device 102 can provide an unknown and untrusted accessor device 104 with access to one or more device resources 103, within the scope of an identified access privilege 107, based on verifying that access credential 126 was issued to accessor device 104 by AE 106, or issued by a subordinate authorization entity (see FIG. 2) under the authority of AE 106, with whom accessee device 102 and/or the respective device resource 103 has a trust relationship.

In some aspects, the communications exchange between accessor device 104 and accessee device 102 may comprise a single round trip of sending access credential 126 and request 111, and receiving a result, such as data returned based on the request or a notification of a denial of access or a denial of the request. In other aspects, a communication session may be established once access credential 126 is verified, including the exchange of multiple requests and results. In such a communication session, although accessee device 102 trusts accessor device 104, accessee device 102 may still verify that each request 111 falls within the scope of granted privileges based on access credential 126. Further, it should be noted that accessor device 104 may not present access credential 126 upon every interaction with accessee device 102. For example, subsequent to an initial presentation and verification of access credential 126, in some aspects, accessor device 104 may only provide proof of identity, such as through use of a previously-generated and previously-exchanged public/private key pair, to accessee device 102, which may then reference a stored indication of the previously-verified credential authenticity and privilege scope on computer platform 203.

Figure 4:
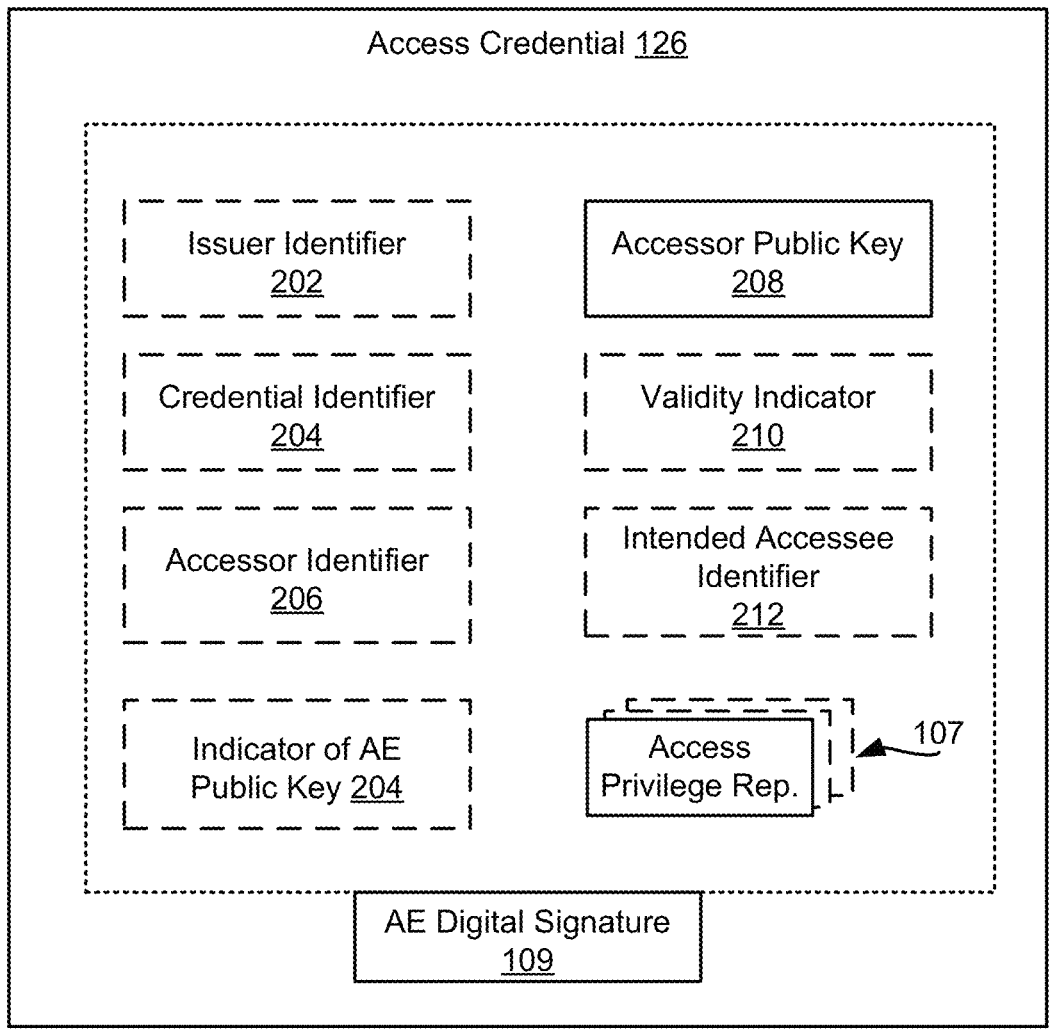
FIG. 4 is a schematic diagram of one aspect of the access credential of FIG. 1.

Referring to FIG. 4, in some aspects, access credential 126 may optionally include additional information, as indicated by the dashed lines, input by AE 106 for identification and/or verification purposes. For example, besides one or more issued access privileges 107 and AE digital signature 109, access credential 126 may include, but is not limited to, one or any combination of an issuer identifier 202, a credential identifier 204, an accessor identifier 206, an indication of an accessor public key 208, a validity indicator 210 or an intended accessee identifier 212.

Issuer identifier 202 may include a name, code, number, or any other type of information that indicates the issuing source, such as a name or hardware identification of authorization entity 106, or such as the X.500 series of computer networking standards name of the entity, e.g., a Certificate Authority that signed access credential 126. Issuer identifier 202 may further include information identifying the algorithm used by AE 106 to sign access credential 126.

Credential identifier 204 may include a name, code, number, or any other type of information that provides a unique identification of access credential 126, for example, to track issued and/or expired access credentials, and also for example a serial number to distinguish it from other certificates. Further, for example, credential identifier 204 may also include unpredictable and/or random data. Additionally, for example, credential identifier 204 may include a pointer or other information identifying a location where an access credential is stored, such as on a network device, thereby enabling a granting entity to forward a credential identifier to a receiving entity, as opposed to having to pass the actual credential. In some aspects, the receiving entity may provide credential identifier 204 to a device to be accessed, and the device to be accessed may utilize the pointer or other location information to obtain or access the corresponding access credential 126 in order to determine if access is to be granted or denied.

Accessor identifier 206 may include a name, code, number, or any other type of information that provides a unique identification of accessor device 104 to which access credential 126 is issued, thereby helping to bind a respective access credential to an identified accessor device.

An indication of accessor public key 208 may include a reference to or an actual copy of a publicly-available cryptographic mechanism corresponding to a private cryptographic mechanism known only to accessor device 104, for example, inclusion of accessor public key 208 may allow accessee device 102 to further verify the identity of accessor device 104 and/or may allow establishment of a secure communication with accessor device 104. Accessor public key 208 may further include an algorithm identifier which specifies which public key cryptographic system the key belongs to and any associated key parameters. In some aspects, AE 106 may include accessor public key 208 within a granted and digitally-signed access credential 126 to enable accessee device 102 to insure that the device requesting access is the proper accessee device to whom the access credential was granted, as is discussed below in more detail.

Validity indicator 210 may include an indicator as to a restriction with respect to the validity of access credential 126. For example, validity indicator 210 may include a time-based restriction, such as one or any combination of a day, a date, a time, a start date and/or time and an end date and/or time, a number of uses, etc. Additionally, for example, validity indicator 210 may include a use-based restriction, such as a predetermined number of uses. Further, for example, validity indicator 210 may include a location-based restriction, such as may be associated with a geographic location and/or a network-based location. Additionally, for example, validity indicator 210 may include a device state-based restriction, such as based on one or any combination of values of any state associated with any function or component of the respective accessee device and/or the respective accessor device.

Intended accessee identifier 212 may include a name, code, number, or any other type of information that indicates a specific accessee device 102 for which access credential 126 is valid, such as a name or hardware identification of accessee device 102. Further, with respect to access credential 126, AE 106 may apply AE digital signature 109 to any one or any combination of the above-noted parameters. Additionally, in some aspects, access credential 126 may include, or may be associated with, AE credential 123 and/or an indicator of an AE public key 204, which may be used to authenticate AE credential 123 and/or AE digital signature 109.

In some aspects, access credential 126 may include all of the above-noted parameters. In other aspects, for example in the case of a very short lived access credential 126, accessor public key 208 may not be included as it may be unnecessary to further verify accessor device 104 and/or it may be unnecessary to utilize accessor public key 208 to establish a secure communication as the duration of the validity of access credential 126 may effectively minimize security threats to accessee device 102. For example, a very short lived validity duration may include access credential 126 having validity indicator 210 representing a number of uses, or in other cases a time period, such as from about 1 minute to about 10 minutes. For a time-based validity indicator 210, a clock that is synchronized between AE 106 and accessee device 102 and/or accessor device 104 may be utilized. Additionally, the clock could be a logical clock or a real time clock. Further, in some aspects, such as when accessor device 104 does not have an established public/private key pair, AE 106 may establish such a key pair for accessor device 104 for use with the device access apparatus and methods discussed herein.

Figure 5:
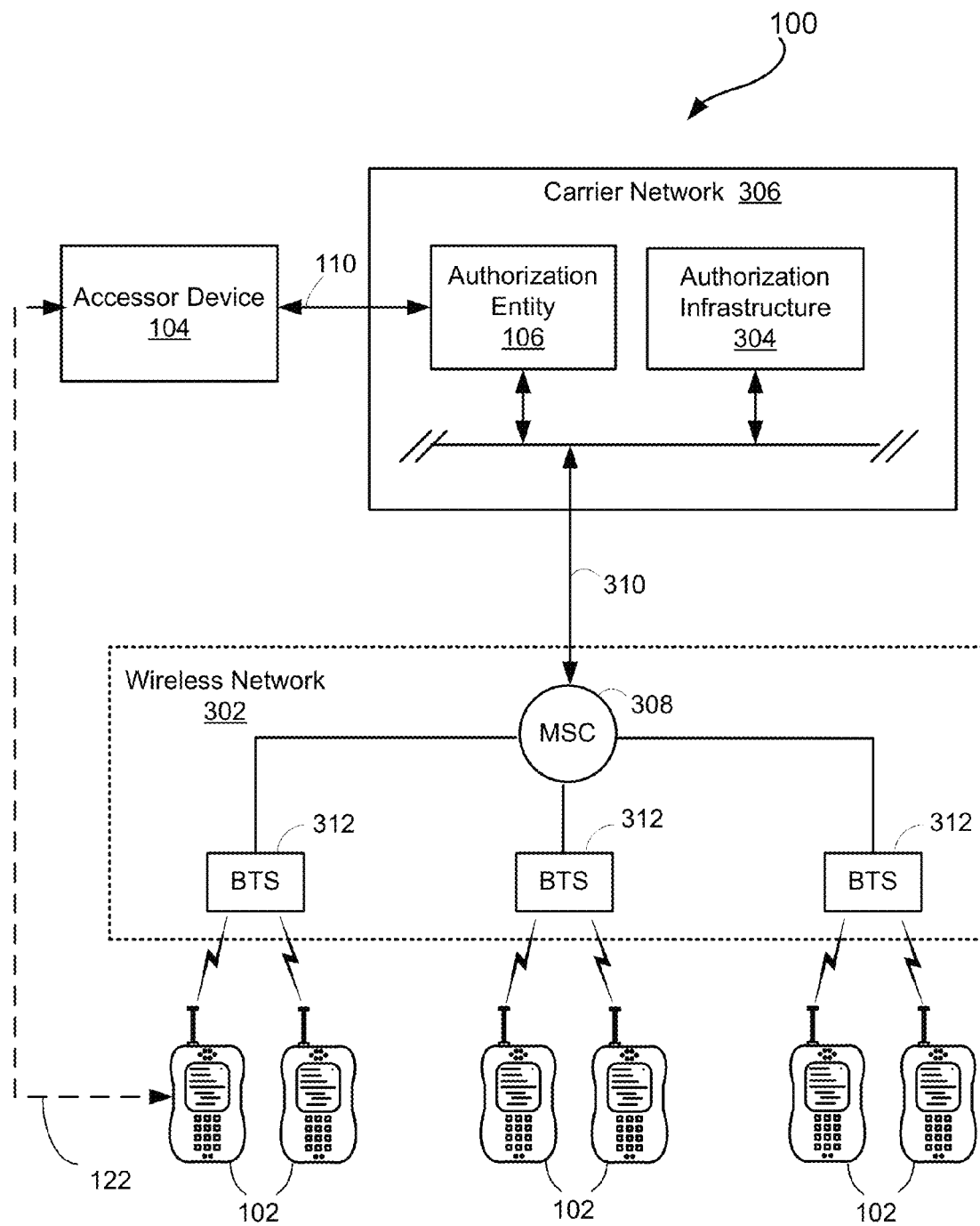
FIG. 5 is a schematic diagram of one aspect of a cellular telephone network of the system of FIG. 1.

Referring to FIG. 5, an aspect of system 100 may incorporate a wireless network 302 and may include any system whereby remote modules, such as wireless client computing devices such as accessee devices 102, communicate over-the-air between and among each other and/or between and among components connected via wireless network 302, including, without limitation, wireless network carriers and/or servers.

In some aspects, AE 106 may be part of a greater authorization infrastructure 304 that may include one or more Certificate Authorities (CA) acting as a root CA or trusted third party. It should be noted, however, that AE 106 is generally considered a CA in some form. When appropriate, AE 106 may obtain a certificate from another server/CA within the authorization infrastructure 304.

Further, in some aspects, system 100 includes the delegation of access credentials, such that one entity or organization, such as AE 106, can issue access credential 126 to other entities, such as accessor device 104, who may further issue additional access credentials to additional entities. For example, authorization infrastructure 304 may include a root CA that may issue an access credential to a carrier network, where the access credential may include one or more access privileges to one or more given accessee devices and/or device resources. In turn, the carrier network may dynamically generate delegated access credentials for employees, service contractors, etc., where the delegated access credentials include access privileges no broader, and typically narrower, than the originally issued privileges as granted by the root CA. The delegation of privileges provides organizational flexibility in granting privileges, as such delegation allows intermediate organizations to issue credentials based on privileges available to the organization. Further, such delegation allows an intermediate organization to control the credentials, as the credentials can be limited to predetermined privileges that are specific to the access required, thereby reducing potential abuse of access privileges.

In some aspects, AE 106, along with any other servers including the authorization infrastructure 304, may be part of a carrier network 306 and are operable to dynamically generate access credentials allowing authorized accessor device 104 to access restricted features, e.g. the plurality of device resources 103 (FIG. 1), on one or more accessee devices 102.

In system 100, carrier network 306 controls messages (sent as data packets) sent to a wireless network 302, and more specifically, to mobile switching center (MSC) 308. The carrier network 306 communicates with the MSC 308 by a network 310, such as the Internet and/or POTS (plain ordinary telephone system). Typically, the network or Internet connection transfers data information between the carrier network 306 and the MSC 310, and the POTS transfers voice information.

The MSC 308 is connected to multiple base stations (BTS) 312, which communicate with one or more accessee devices 102, which are wireless devices in this example. In a similar manner to the carrier network, the MSC 308 is typically connected to each BTS 312 by both the network and/or Internet for data transfer and POTS for voice information. Each BTS 312 ultimately wirelessly exchanges voice and data calls with accessee devices 102, such as cellular telephones, by short messaging service (SMS) and/or other over-the-air methods.

Figure 6:
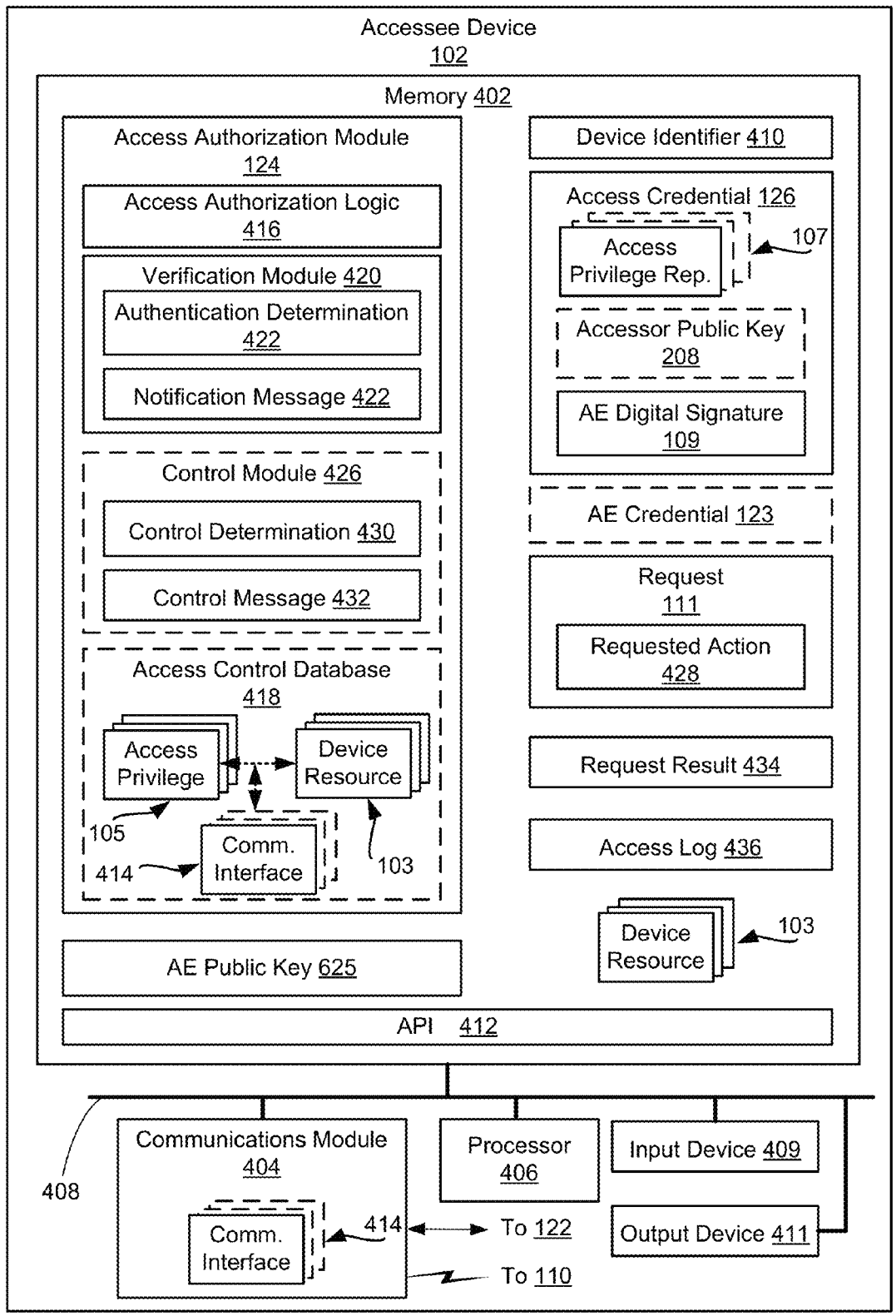
FIG. 6 is a block diagram of one aspect of a client computing device, referred to as an accessee device, of the system of FIG. 1.

Referring to FIG. 6, accessee device 102 may include, for example, one or more computing device components including processing circuits executing resident configured logic, where such a computing device includes, for example, microprocessors, digital signal processors (DSPs), microcontrollers, portable wireless telephones, personal digital assistants (PDAs), paging devices, a wireless modem, a PCMCIA card, an access terminal, a personal computer, and any suitable combination of hardware, software and/or firmware containing processors and logic configured to at least perform the operations described herein.

In some aspects, accessee device 102 includes memory 402, communications module 404, and processor 406, each communicatively coupled via a bus 408. Memory 402 may include one or more of any type of volatile and/or non-volatile memory, including all known types of memory, which provide for the storing of configured logic. In addition, although memory 402 is shown as one contiguous unit of one type of memory, other aspects use multiple locations and/or multiple types of memory as memory 402. Additionally, the memory 402 may further include a device identifier 410, e.g., a serial number, a hardware identifier, global identifier (GID), and IP address, a transient identifier such as a nonce, etc., which is operable to uniquely identify the accessee device 102. Further, the communications module 404 provides input and output to resources on device 102 via the bus 408, as well as providing input and output between accessee device 102 and an external device. Additionally, the processor 406 operates on instructions and data provided via the bus 408.

Additionally, in some aspects, accessee device 102 may include a runtime environment executing to provide an interface between applications running on the device and processor 412 and/or predetermined ones of the plurality of device resources 103. Such a runtime environment may be referred to as an application programming interface (API) 412. One such runtime environment or API 412 is BREW® software platform developed by Qualcomm Incorporated of San Diego, Calif. In other aspects, however, accessee device 102 is suitable for use with other types of runtime environments (APIs) that, for example, operate to control the execution of applications on the accessee device.

In some aspects, communications module 404 may include a plurality of communication interfaces 414, each of which provide a connection to a corresponding one or more of the plurality of device resources 103. For example, plurality of communication interfaces 414 include, but are not limited to, one or any combination of: a serial port, a debug port, an infrared port, a Bluetooth™ port, a network socket connection, a universal serial bus (USB), a FireWire™ interface, and a high-frequency wireless local area network connection such as a wireless fidelity (WiFi) path.

Further, accessee device 102 may include one or more input devices 409 and one or more output devices 411 to allow for user interaction with accessee device 102. Input device 409 may include, but is not limited to, a device such as a port, a key, a microphone, a touch-sensitive display, a mouse, etc. Output device 411 may include, but is not limited to, a device such as an audio speaker, a display, a haptic interface, a mechanical vibrator, etc. Input device 409 and output device 411 may be communicatively coupled with other device components through bus 408.

Accessor device 104 may access the accessee device 102 through communications interface 414, such as over either or both of local connection 122 and remote path through network 110. Typically, a physically connected local connection, e.g., a hardwired serial connection, does not need integrity protection or encryption for exchanging data. Furthermore, local connections may not need an authentication protocol, e.g. a zero-knowledge proof that can defend against man-in-the-middle attacks. Accordingly, whereas remote connections may need a secure socket layer (SSL) or equivalent, local connections may suffice with a less secure communication protocol.

In order that privileged actions over a local connection 122 and/or a remote connection through network 110 may be performed on accessee device 102 without compromising the integrity of the device, memory 402 may include the dynamic access authorization module 124. Based upon access credential 126 supplied by accessor device 104, and further based on AE credential 123, the access authorization module 124 may be configured to allow authorized users, e.g., accessor device 104, a high granularity of privileged features on the accessee device 102.

In some aspects, the access authorization module 124 may be preloaded into a memory 402 of the accessee device 102. In other aspects, the access authorization module 124 may be a later-added module, which may be digitally signed for authentication purposes. For example, access authorization module 124 may be downloaded onto the accessee device 102 by another device, such as accessor device 104.

Prior to loading of the access authorization module 124, the operating environment provided by accessee device 102 substantially limits the privileges granted to an externally-connected device such as accessor device 104. Once loaded, the access authorization module 124 becomes a gatekeeper, providing a high degree of granularity in the granting of access to privileged interactions with one or more of the plurality of device resources 103. In particular, access authorization module 124 communicates with an accessing device, e.g., accessor device 104, to receive an AE-issued access credential 126 granting specific access privileges 107, which may be specifically tied to one or more of the plurality of device resources 103. For example, as noted above, AE 106 (FIG. 1) and accessee device 102 and/or device resources 103 may agree in advance on a definition of each of the plurality of available access privileges 105, as well as on an association between each available privilege and access or interaction with at least one of the plurality of device resources 103. Further, accessee device 102 may additionally limit access to predetermined ones of the plurality of device resources 103 based on which one of the plurality of communication interfaces 414 are being accessed. In some aspects, for example, access authorization module 124 or each device resource 103 may include an access control database 418 to store the various agreed upon relationships between the plurality of available access privileges 105, the respective device resource 103 and, optionally, the plurality of communication interfaces 414.

Access authorization module 124 may include one or any combination of hardware, software, executable instructions, and data operable to carry out the functionality described herein. In some aspects, access authorization module 124 may include access authorization logic 416, which is executable by processor 406 to manage the operations of access authorization module 124.

In some aspects, access authorization module 124 may include a verification module 420 operable to inspect a received access credential 126 and AE credential 123, and determine authenticity and privilege scope. For example, verification module 420 verifies AE digital signature 109 contained in access credential 126 using AE public key 625. Further, for example, verification module 420 verifies issued privileges 107 are within the scope of AE credential 123. Based on this verification process, verification module 420 may issue an authentication determination 422. Authentication determination 422 represents a result of the verification process, such as an "authenticated" result or a "not authenticated" result with respect to either or both of the access credential and the issued privileges. In the case of authentication determination 422 corresponding to an "authenticated" result, access authorization module 124 accepts access credential 126, thereby allowing a respective device resource 103 to provide access to accessor device 104 based on the one or more issued access privileges 107 included in access credential 126. In the case of authentication determination 422 corresponding to a "not authenticated" result with respect to the credential, access authorization module 124 denies access credential 126, thereby allowing a respective device resource 103 to not allow access by accessee device 102. In the case of authentication determination 422 corresponding to a "not authenticated" result with respect to the issued privileges 107, depending on a configurable system policy, access authorization module 124 may entirely deny access or may allow access only based on privileges falling within the approved scope. In any case, verification module 420 may be operable to generate an access notification message 424, and initiate transmission thereof, via communication module 404, to the device providing access credential 126, e.g. accessor device 104, where notification message 424 communicates the result of the credential authorization process.

Further, access authorization module 124 may inspect a proof of identity supplied by accessor device 104 to verify the identity of accessor device 104. For example, the proof of identity may include an exchange of communications where accessee device 102 can verify the identity of accessor device based on accessor public key 208, which may be included within access credential 126 in order to be used to verify the identity of the authorized accessor. In particular, access authorization module 124 will be able to verify the identity of accessor device 104 based on received messages encrypted using the corresponding private key of the accessor device. Additionally, the proof of identity provide by accessory device 104 may be included initially, along with access credential 126.

Additionally, in some optional aspects, access authorization module 124 may further include a control module 426 operable to insure that a device granted access, e.g. accessor device 104, is provided access within the bounds or scope of the one or more issued access privileges 107 included in an "authenticated" access credential 126. For example, control module 426 inspects request 111 received from a device granted access, e.g. accessor device 104, to insure that each requested action 428 included in request 111 falls within the scope of at least one issued privilege 107. For example, control module 426 may reference access control database 418 and compare requested action 428 with the one or more device resources 103 with which interaction is allowed based on the one or more issued access privileges 107. Further, in some optional aspects, control module 426 may additionally consider which one of the plurality of communication interfaces 414 is being used by accessor device 104 and further limit access based thereon. As such, based on this control process, control module 426 may issue a control determination 430. Control determination 422 represents a result of the control process, such as a "valid" result or a "not valid" result, e.g. where requested action 428 respectively falls within or lies outside the scope of one or more issued privileges 107. In the case of control determination 430 corresponding to a "valid" result, access authorization module 124 accepts requested action 428 and allows accessee device 102 to perform the action. In the case of control determination 430 corresponding to a "not valid" result, access authorization module 124 denies requested action 428 and does not allow the action to occur. In either case, but more likely in the "not valid" result case, control determination 430 may be operable to generate, and initiate transmission via communication module 404 of, a control message 432 to the device providing access credential 126, e.g. accessor device 104, where control message 432 communicates the result of the action control process.

In other aspects, access authorization module 124 may not include control module 426 and access control database 418, but the above-described functionality of controlling access may be incorporated within the respective device resource 103. For example, each device resource 103 may include all or some portion of the above-described functionality of control module 426 and access control database 418. As such, in these aspects, each respective device resource 103 is operable to determine whether or not a received request 111 is within the bounds of an issued access privilege 107 of a verified access credential 126, and responds accordingly. In some aspects of this case, each device resource 103 has a trust relationship with AE 106, and thereby the definition of each of the plurality of access privileges 105 (FIG. 1) with respect to the device resource 103 are known and agreed upon, e.g. they are predetermined prior to the issuance of access credential 126. In other aspects of this case, each privilege 105 (FIG. 1) corresponds to a known aspect of the respective device resource 103, and thus a predetermined relationship does not need to be established, but access to some aspect of the respective device resource 103 may be granted merely based on the trust relationship and verification of access credential 126.

Additionally, in some aspects, access authorization module 124, or each respective device resource 103 may be operable to manage the transmission of a request result 434 to accessor device 104 in response to request 111. Request result 434 may include information related to the processing of requested action 428 by a respective one of the plurality of device resources 103. For example, request result 434 may identify one or any combination of the action requested, one or more of the plurality of device resources 103 associated with the interaction, and/or a result of the requested action.

Additionally, in some aspects, access authorization module 124 or each device resource 103 may be operable to maintain an access log 436, which may store information related to communications with AE 106 and/or accessor device 104. For example, access log 436 may provide an audit trail of agreed upon relationships between the plurality of device resources 103 and the plurality of access privileges 105, received access credentials 126, as well as requests 111, requested actions 428 and request results 434 with respect to interactions with respective accessor devices 104. Similar logs may be maintained by accessor device 104 and AE 106 in order to correlate actions within system 100, thereby potentially identifying breaches in the security of system 100.

Figure 7:
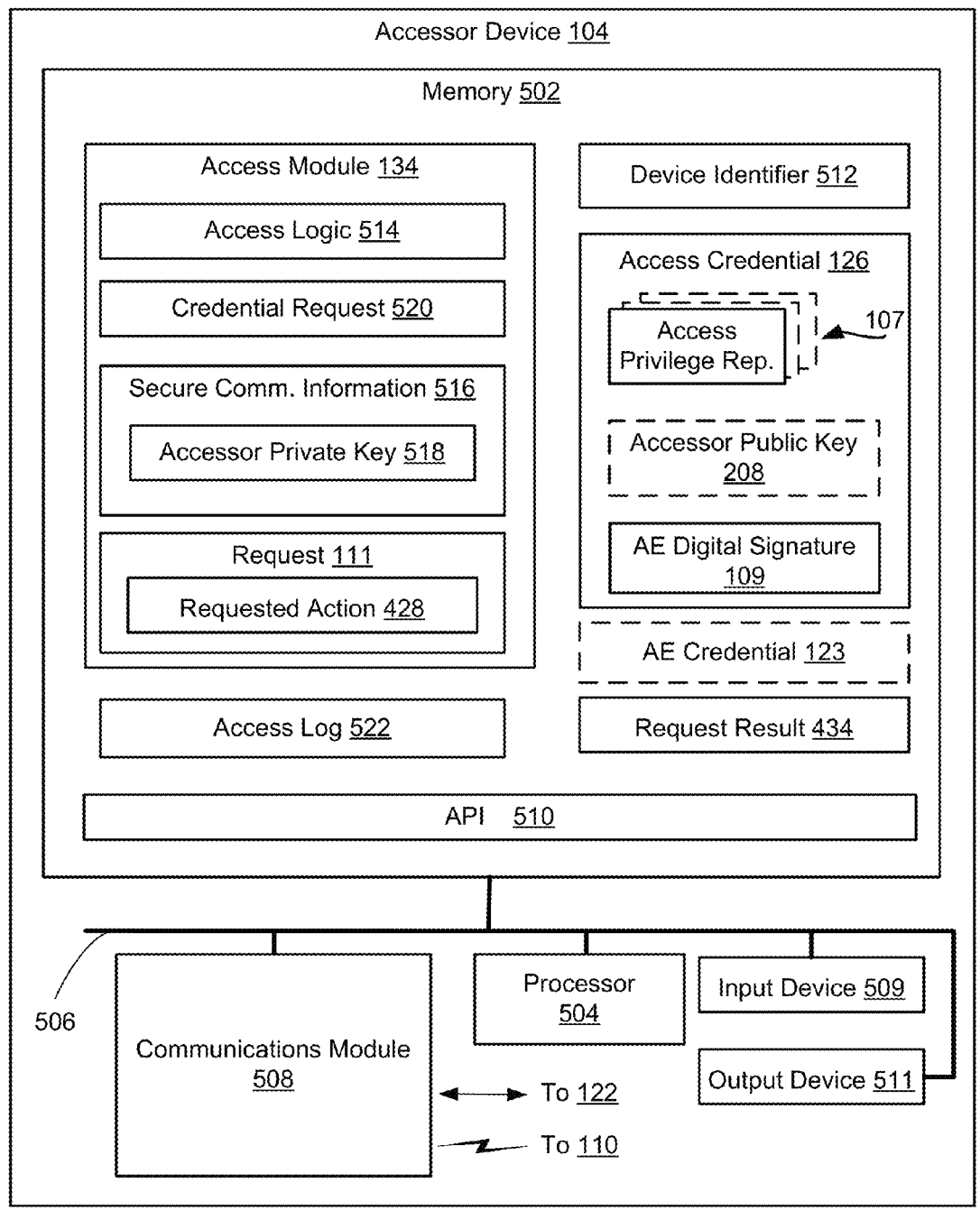
FIG. 7 is a block diagram of one aspect of an external computing device, referred to as an accessor device, configured for privileged access to restricted features on a client computing device according to the system of FIG. 1.

Referring to FIG. 7, in at least one aspect, accessor device 104 is operable to obtain access credential 126 from AE 106 and forward it to accessee device 102, which is operable to authenticate access credential 126 and allow one or more predetermined interactions with the plurality of device resources 103 based on the issued access privileges 107. Although illustrated as a laptop computer, accessor device 104 may include any type of wired or wireless computerized device, such as a cellular telephone, a PDA, a pager, and a desktop computer.

In one aspect, for example, accessor device 104 may include a memory 502 operable to store applications and/or programs executable by a processor 504. Memory 502 and processor 504 may be communicatively coupled via a bus 506, which may be further communicatively coupled with a communications module 508.

Communications module 508 may include hardware, software, executable instructions, and data enabling the receipt, transmission, and/or exchange of information within accessor device 104 and between accessor device 104 and external devices. For example, communications module 508 may provide for an exchange of data among components of accessor device 104, as well as between accessor device 104 and an external communication network, such as network 110, and an external device, such as accessee device 102 and authorization entity 106. For example, communications module 508 may be operable to communicate with accessee device 102 and/or AE 106 over local connection 122 and/or via network 110. Additionally, communications module 508 may include transmit and receive chain components respectively for transmitting and receiving information to and from external devices.

Further, accessor device 104 may include one or more input devices 509 and one or more output devices 511 to allow for user interaction with accessor device 104. Input device 509 may include, but is not limited to, a device such as a port, a key, a microphone, a touch-sensitive display, a mouse, etc. Output device 511 may include, but is not limited to, a device such as an audio speaker, a display, a haptic interface, a mechanical vibrator, etc. Input device 509 and output device 511 may be communicatively coupled with other device components through bus 506.

Further, in some optional aspects, accessor device 104 may include a runtime environment executing to provide an interface between applications and/or modules running on the device and processor 504. Such a runtime environment may be referred to as an application programming interface (API) 510. One such runtime environment or API 510 is the BREW® software platform developed by Qualcomm Incorporated of San Diego, Calif. In other aspects, however, accessor device 104 may utilize other types of runtime environments that, for example, operate to control the execution of applications on the accessor device.

Additionally, memory 502 may include a device identifier 512, e.g., a serial number, a hardware identifier, global identifier (GID), a globally unique identifier (GUID), a chip identifier, etc., which is operable to uniquely identify accessor device 104.

Further, memory 502 may include access module 134 operable to provide communication with accessee device 102 and/or AE 106. Access module 134 may include access logic 514 to carry out all or some portion of the functionality described herein with respect to access module 134. For example, access logic 514 may be operable to receive access credential 126, and optionally AE credential 123, and forward it/them to accessee device 102 in order to gain access to one or more of the plurality of device resources 103 on accessee device 102. Further, access logic 514 may be operable to generate request 111 and requested action 428 once access to accessee device 102 is authorized. For example access logic 514 may receive inputs, via communications module 508, representative of requested action 428 from a user of accessor device 104 in order to generate request 111. Additionally, access logic 514 may be operable to receive and analyze or further process request result 434, if any.

Additionally, in some aspects, access module 134 may be operable to generate a credential request 520 and transmit, via communications module 508, request 520 to AE 106. For example, credential request 520 may identify accessor device 104, such as via device identifier 512, as well as a requested one or more of the plurality of access privileges 105 (FIG. 1). It should be noted, however, that credential request 520 may not be necessary, and that AE 106 and/or another device with authorization infrastructure 304 (FIG. 4) may unilaterally assign or issue access credential 126 to accessor device 104.

In some aspects, access module 134 may include secure communications information 516 operable to enable secure communications with an external device, such as AE 106 and/or accessee device 102. For example, secure communications information 516 may include protocols for establishing the identity of accessor device 104, and for exchanging information in a secure manner once identity has been established. For example, such protocols may be utilized in instances in which accessor device 104 transmits credential request 520 to AE 106. Further, for example, such protocols may be utilized to exchange information with accessee device 102 after access credential 126 has been authenticated. For example, secure communications information 516 may include encryption and decryption mechanisms 517, such as symmetrical keys, which may allow for a quicker exchange of information when compared to other encryption mechanisms, such as the use of public/private key pairs. Additionally, secure communications information 516 may include accessor device private key 518, which may be used to encrypt and/or digitally sign messages, and/or to decrypt received messages encrypted with the corresponding accessor device public key. Accessor private key 518 is part of a key pair, along with accessor public key 208, which may be stored in a non-secure area of memory 502. In some aspects, encryption between accessor device 104 and accessee device 102 may not be utilized. For example, encryption may not be utilized with a sufficiently short-lived access credential 126, based upon validity indicator 210. On the other hand, in some other aspects, the data transmitted over the interface may be encrypted, for example, using Secure Socket Layer (SSL).

Additionally, in some aspects, access module 134 may be operable to maintain an access log 522, which may store information related to communications with AE 106 and/or accessee device 102. For example, access log 522 may provide an audit trail of credential requests 520, received access credentials 126, as well as requests 111, requested actions 428 and request results 434 with respect to interactions with respective accessee devices 102. As noted above, similar logs may be maintained by accessee device 102 and AE 106 in order to correlate actions within system 100, thereby potentially identifying security leaks within system 100.

Figure 8:
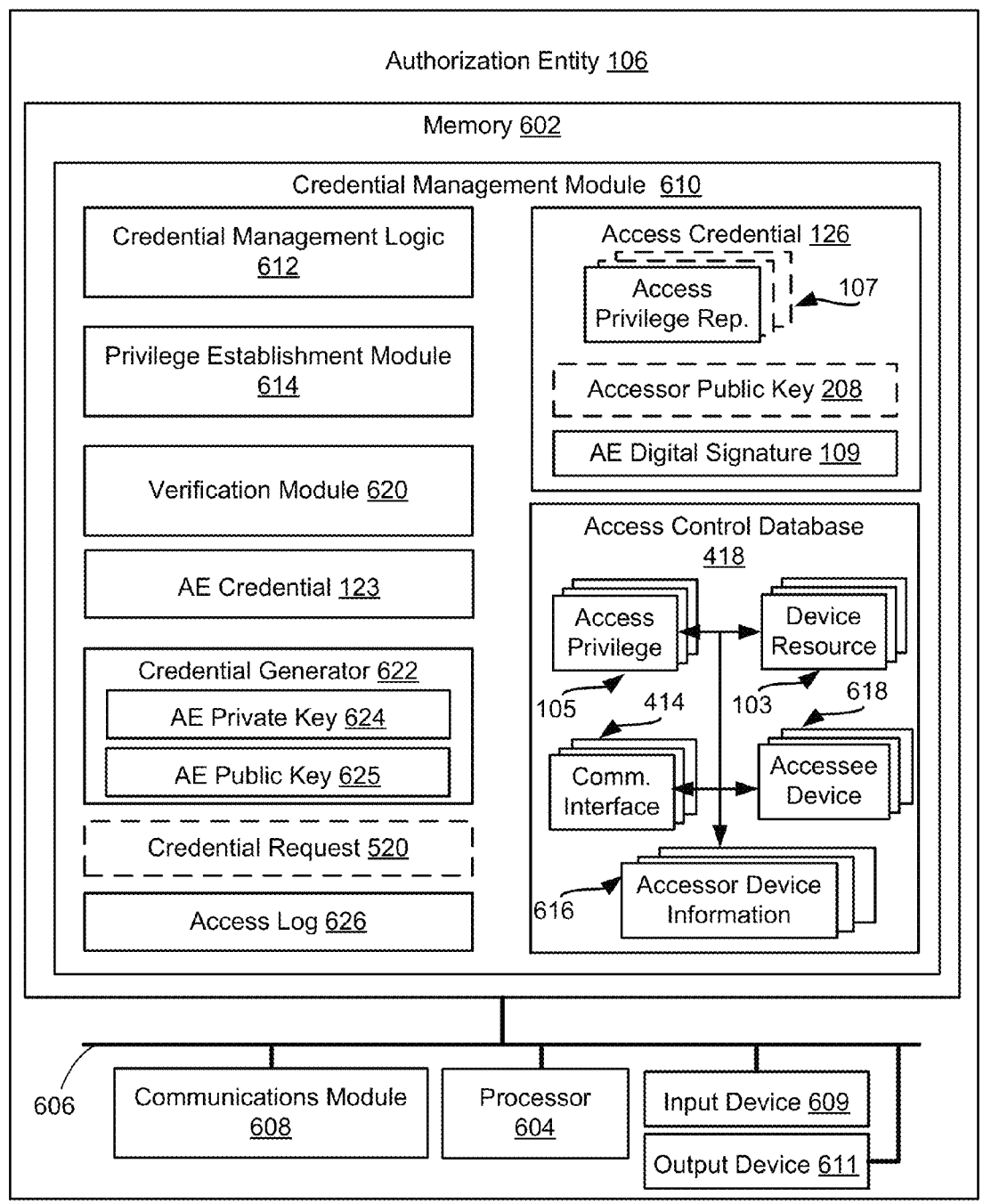
FIG. 8 is a block diagram of one aspect of an authorization entity, which may be implemented in a server, as used in the system of FIG. 1.

Referring to FIG. 8, in one aspect, AE 106 is operable to dynamically generate access credential 126 that authorizes accessor device 104 to perform normally restricted interactions with one or more of the plurality of device resources 103 of accessee device 102. Although discussed with reference to accessor device 104 and accessee device 102, it should be understood that AE 106 is operable to generate access credential 126 to a plurality of accessor devices with respect to each accessee device, and/or to generate access credential 126 for accessing a plurality of accessee devices, and/or to generate one or more subordinate credentials, e.g. subordinate credential 129 (FIG. 2), to one or more subordinate AEs who may then in turn themselves grant access credential 126 or who may grant one or more further subordinate credentials that can be used to grant access credential 126, and so on.

AE 106 may include at least one of any type of server, personal computer, mini computer, mainframe computer, or any computing device either special purpose or general computing device. Further, there can be separate servers or computer devices associated with AE 106 that work in concert to provide data in usable formats to parties, and/or to provide a separate layer of control in the data flow between an access device 102 and the AE 106.

In one aspect, AE 106 may include a memory 602 operable to store applications and/or programs executable by a processor 604. Memory 602 and processor 604 may be communicatively coupled via a bus 606, which may be further communicatively coupled with a communications module 608.

Communications module 608 may include hardware, software, executable instructions, and data enabling the receipt, transmission, and/or exchange of information within AE 106 and between AE 106 and external devices. For example, communications module 608 may provide for an exchange of data among components of AE 106, as well as between AE 104 and an external communication network, such as network 110, and an external device, such as accessee device 102 and accessor device 104. For example, communications module 608 may be operable to communicate with accessee device 102 and/or accessor device over a local connection and/or via network 110. Additionally, communications module 608 may include the transmit and receive chain components for transmitting and receiving information respectively to and from external devices.

Further, AE 106 may include one or more input devices 609 and one or more output devices 611 to allow for user interaction with AE 106. Input device 609 may include, but is not limited to, a device such as a port, a key, a microphone, a touch-sensitive display, a mouse, etc. Output device 611 may include, but is not limited to, a device such as an audio speaker, a display, a haptic interface, a mechanical vibrator, etc. Input device 609 and output device 611 may be communicatively coupled with other device components through bus 606.

In addition, memory 602 may include a credential manager module 610 operable to generate access credential 126 and/or subordinate credential 129 (FIG. 2), based on AE credential 123, for one or more accessor devices 104 and/or subordinate AEs 117 (FIG. 2) to respectively allow for access to the resources of one or more accessee devices 102 and to allow for the further delegation of privileges. In some aspects, credential manager module 610 includes credential management logic 612 executable by processor 604 to perform the functionality described herein.

In some aspects, credential manager module 610 may include a privilege establishment module 614 operable to interact with accessee device 102 and/or each respective device resource 103 to establish relationships between each of the plurality of device resources 103 and respective ones of the plurality of access privileges 105. Optionally, privilege establishment module 614 may additionally restrict these relationships based on one or more of the plurality of communications interfaces 414 on the respective accessee device 102. Further, such relationships also may vary depending on accessor device information 616, such as accessor device identifier 410 (FIG. 5), a role of accessor device 104 and/or a user of accessor device, an entity associated with an accessor device, such as a company name, a login information associated with an accessor device, a security or encryption mechanism associated with an accessor device, etc. Privilege establishment module 614 may store these relationships, for each of a plurality of accessee devices 618, in an access control database 418. As noted above, the privileges available to be granted with respect to each accessee device 102 and/or each device resource 103 may vary from one AE 106 to another, for example, when delegation of privileges is implemented in system 100 (FIG. 1).

Additionally, credential management module 610 may further include a verification module 620 to confirm which of the plurality of access privileges 105 may be granted to a respective accessor device 104 and/or subordinate authorization entity 117 (FIG. 2) as issued access privileges 107. Verification module 620 may operate in response to credential request 520, or based on the actions of a user of AE 106 to assign access credential 126 and/or subordinate credential. For example, verification module 620 may verify an identity of accessor device 104 and/or subordinate authorization entity 117 (FIG. 2), such as based on information contained with credential request 520, and/or may confirm allowable ones of the plurality of access privileges 105 to be granted to a unilaterally proposed accessor device 104. For example, during credential acquisition, authenticating accessor device 104 may allow for control and traceability of which, and how many, devices 102 are accessed by which personnel. In the case of on-line servers, for example, two-factor authentication of accessor devices may be implemented, using, for example, RSA SecurId Token verification, which requires on-line access to an appropriate authentication server.

Further, credential management module 610 may further include a credential generator 622 operable to generate access credential 126 and/or subordinate credential 129 (FIG. 2), including applying access entity (AE) private key 624 to access credential 126 to form AE digital signature 109, and optionally attaching AE credential 123. It should be noted that AE private key 624 may be validated by corresponding AE public key 625. Credential generator 622 may then be further operable to initiate transmission, via communications module 608, of access credential 126 to a respective accessor device 104.

In some aspects, the communication channel between AE 106 and accessor device 104, for example including network 110, may utilize a secure communication protocol, such as, Secure Socket Layer (SSL), to protect the contents of access credential 126 transmitted to accessor device 104.

Additionally, in some aspects, credential management module 610 may be operable to maintain an access log 626, which may store information related to communications with accessor device 104 and/or accessee device 102 and/or subordinate authorization entities. For example, access log 626 may provide an audit trail of credential requests 520 and transmitted access credentials 126, as well as established relationships between access privileges and device resources with respect to each accessee device. As noted above, similar logs may be maintained by accessee device 102 and/or accessor device 104 and/or subordinate authorization entities in order to correlate actions within system 100, thereby potentially identifying security leaks within system 100.

Figure 9:
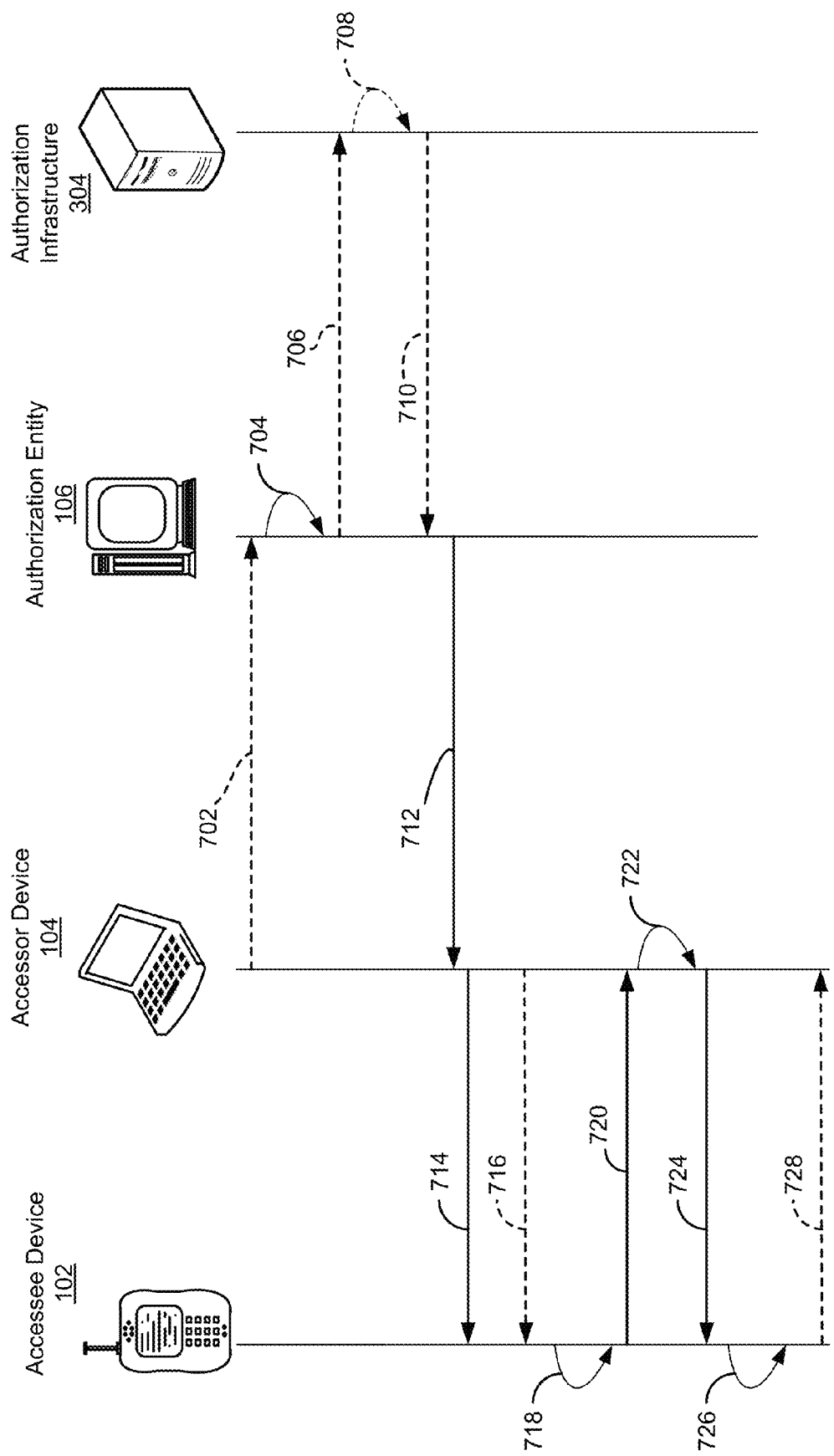
FIGS. 9 and 10 are message flow diagrams according to respective aspects of methods of the system of FIG. 1.

Referring to FIG. 9, one aspect of a message flow within system 100 provides accessor device 104 with predetermined privileges to perform normally restricted actions on accessee device 102. At optional Event 702, accessor device 104 may transmit a message that includes a credential request 520 (FIG. 7) to AE 106, or to a subordinate AE having credentials and privileges delegated from a master AE. The credential request message may further include additional accessor device-related information. For example, a password and/or passcode, data identifying accessor device 104, data identifying one or more accessee devices 102, data identifying one or more desired privileges, and/or data identifying desired actions to perform on each respective accessee device or with respect to each device resource. In some aspects, the accessor device 104 logs onto an AE 106 with a username/password combination 430, which is then authenticated using password authentication logic. Upon being authenticated, the accessor device 104 may transmit an access credential request to acquire an access credential 126 for a respective accessee device and/or a respective device resource.

Communication with AE 106 may be made over network 110, for example using a commercially available web browser residing on the accessor device 104. Secure communications may be enabled by use of a secure protocol such as HTTPS, including a username/password exchange mechanism.

At Event 704, AE 106 may generate access credential 126 by execution of credential management module 610 (FIG. 7), either upon receipt of the credential request message 520 or upon independent operation as directed by a user. For example, AE 106 may execute credential management module 610 (FIG. 8), as discussed above, to process credential request 520, verify accessor device 104 and/or the requested actions/privileges, and/or generate access credential 126 (FIG. 7).

In one or more alternative aspects, such as when AE 106 does not include the proper mechanisms and/or the authority to grant a request 520 for access credentials, AE 106 may either forward credential request 520 to another network entity, e.g. a higher level subordinate AE and/or the master AE, or request additional mechanisms or authority from another network entity with greater authority. This process is illustrated in FIG. 9 at Events 706, 708 and 710. For example, in order to generate a dynamically generated short-term credential compatible with the runtime environment, e.g., BREW®, of the accessee device 102, AE 106 accesses authorization policies that relate to the granting of privileges. Accordingly, as illustrated by Events 706, 708 and 710, if the AE 106 does not include the proper policies/privileges, it cannot itself generate credential 126, and thus it may connect to a specific authorization entity, such as a higher level subordinate or such as the master AE, within the carrier authorization infrastructure 304 and issue a request for the respective credential. As not all privileges/policies may be available on all servers, carrier authorization infrastructure 304 may include multiple servers including a root Certificate Authority (CA), e.g. the master authorization entity, and one or more other trusted CAs, e.g. the subordinate authorization entities, that each may provide a subset of different policies, e.g., debugging, voicemail, and content transfer, etc.

For example, at optional Event 706, AE 106 may transmit a credential request message to authorization infrastructure 304 (FIG. 5), which may include requests for additional mechanisms and/or authority. The credential request that is transmitted at Event 706 may be a forwarding of the credential request originally transmitted from the accessor device 104 to AE 106, or the credential request may be a newly generated message, for example, which may additionally include requests for additional mechanisms/authority to process credential request 520.

Further, for example, at optional Event 708, authorization infrastructure 304 analyzes the received credential request message, generates access credentials, and/or provides additional mechanisms/authority to process the credential request 520. At optional Event 710, authorization infrastructure 304 transmits a credential request response message back to AE 106. The credential request response message of Event 710 may include access credential 126, a notification of the result of the analysis at event 708, such as a denial of credential request 520, and/or additional mechanisms and/or authority for use by AE 106 to perform event 704 as discussed above. The access credential response message may include an indication of the granted privileges and may be digitally signed to guarantee both the integrity of the data and the authenticity of the sender. Digital signatures may be sent with or without first encrypting the message. If the link between the authorization infrastructure 304 and AE 106 is secure, as when using a HTTPS established connection, or if the validity period of the certificate is extremely short, the digitally signed access credential 126 may not be encrypted.

In some optional aspects, encryption module 512 running on the AE 106 verifies a hash associated with an encrypted, received access credential, for example, via the public key of the CA. If the received hash is verified, then the AE 106 knows the credential has not been modified and that it was sent by the owner of the private key, e.g., the CA.

The access credential 126 may include data fields and may be formatted as described above. In addition, the access credential 126 may include a list of privileges granted by the CA.

At Event 712, AE 106 transmits a message to accessor device 104, the message including the access credential 126 and optionally the AE credential 123 or some reference thereto, or, in some aspects, the denial of a requested credential. Thus, AE 106 thereby grants accessor device 104 with one or more predetermined access privileges 107 from a plurality of available access privileges 105 corresponding to one or more of the plurality of device resources 103, and in some aspects with respect to a given accessee device 102.

At Event 714, accessor device 104 may establish communication with accessee device 102, such as via network 110 and/or connection 122, and forward access credential 126, and optionally AE credential 123, to accessee device 102 in an attempt to gain access to one or more of the plurality of device resources 103 of accessee device 102. Further, such communication may be established with respect to a predetermined one of a plurality of communication interfaces 414 (FIG. 5) of accessee device 102, which may be relevant to whether or not access is granted. Generally, a physically connected local path, e.g., connection via a hard-wired USB port, does not need integrity protection or encryption for the bulk transfer of data. Local hardwired paths may not need an authentication protocol that can defend against man in the middle scenarios (e.g., zero-knowledge proof). Accordingly, an accessor device 104 connected to the accessee device 102 via a remote path may require SSL or equivalent, whereas an accessor device 104 communicating with accessee device 102 over a local path may implement a much simpler authentication and/or encryption method.

At optional Event 716, the authorization module 124 (FIG. 5) may be transmitted from the accessor device 104 to the accessee device 102 if the accessee device is lacking such a module. In some aspects, the authorization module 124 is transmitted in unison with the transmission of access credentials 126, however, in alternate aspects, the authorization module 124 may be communicated from the accessor device 104, or from another network device, at any point in time. As discussed previously, the accessee device 102 may be preconfigured at manufacture or point-of-sale with the authorization module 124 and, as such, there may be no need to communicate the authorization module 124 to the accessee device 102.

When communicating with the accessee device 102 over non-secure access paths, the downloading device, in this instance accessor device 104, may act as a secure socket layer (SSL) server. Accordingly, accessor device 104 opens a connection to the accessee device 102, listens for SSL requests, and negotiates SSL. The forwarding of access credential 126 (Event 714) or the communication of the authorization module 124 (Event 716) may include a command to the accessee device 102, such as a reboot command, causing the device 102 to discover and install the access authorization module 124.

Once the access authorization module 124 is installed on the accessee device 102, either as part of the original installation or as part of the download procedure described above, the access authorization module 124 is operable to receive communications from accessor device 104 that may include access credential 126 that allow accessor device 104 to perform otherwise restricted actions on the accessee device 102.

At Event 718, accessee device 102 authenticates/verifies the access credential 126 by validating the AE digital signature 109 (FIG. 3) with the corresponding AE public key 625 and by verifying issued privileges 107 with respect to AE credential 123. Further, accessee device 102 verifies the identity of accessor device 104 based on accessor public key 208. The authentication process may result in accessor device 104 and/or access credential 126 being authenticated, or authenticated in part, thereby causing accessee device 102 to accept access credential 126 and allow access to one or more device resources 103 according to one or more issued access privileges 107 within the approved scope based on AE credential 123, e.g. if the privileges in the access credential are less than or equal to the scope of privileges in the AE credential. Alternatively, the authentication process may result in accessor device 104 and/or access credential 126 being denied authentication, in which case the access credential is not accepted and access is denied to the one or more device resources 103. At Event 720, the accessee device 102 communicates a notification message 422 (FIG. 6) that represents a result of the authentication process, such as an "authenticated" result, an "authenticated in part" result, or a "not authenticated" result.

At Event 722, if the accessor device 104 receives a notification message indicating that the access credential has been authenticated or authenticated in part, then access module 134 (FIG. 7) may generate a request 111 (FIG. 7) including an access action 428 (FIG. 7). For example access logic 514

(FIG. 7) may receive inputs, via input device 509 (FIG. 7), representative of requested action 428 from a user of accessor device 104 in order to generate request 111. At Event 724, request 111 is transmitted to accessee device 102.

At Event 726, accessee device 102 inspects request 111 received from the accessor device 104 to insure that each requested action 428 included in request 111 falls within the scope of at least one issued privilege 107. For example, each respective device resource 103 corresponding to requested action 428, or access authorization module 124, may implement action control functions. For example, control functions include each respective device resource 103 or control module 426 (FIG. 6) operating to reference access control database 418 (FIG. 6) and compare requested action 428 with the one or more issued access privileges 107. At optional Event 728, accessee device 728 may transmit a control message 432 (FIG. 6) to accessor device 104, where control message 432 communicates the result of the action control process.

Figure 10:
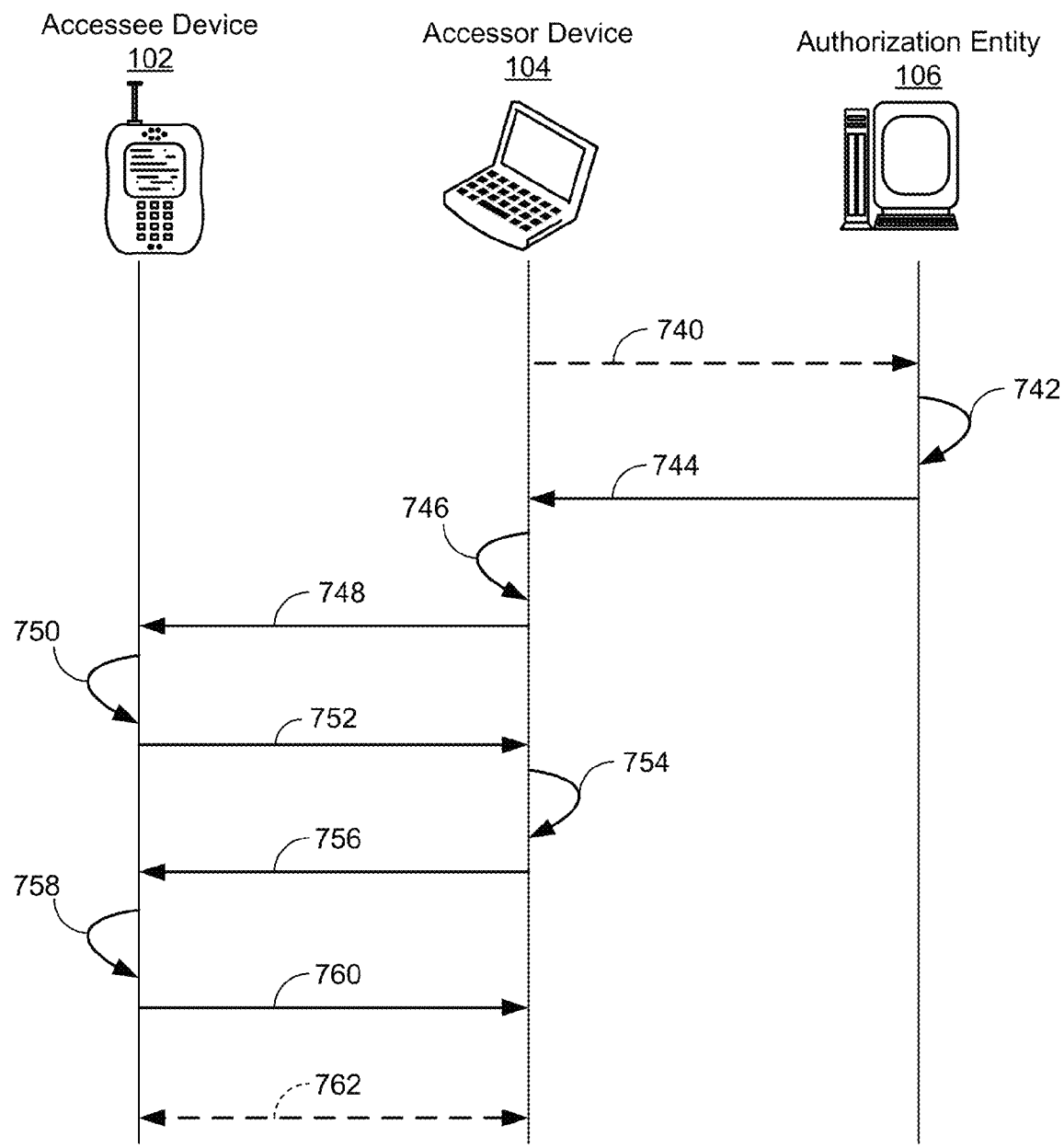

Referring to FIG. 10, in one aspect, a method of accessee device insuring that interaction is occurring with the authorized accessor device, for example upon an initial access attempt or upon an access attempt subsequent to authorization, includes accessor device being required to prove its identity. Optionally, at Event 740, the method includes accessor device 104 requesting access privileges to one or more device resources 103, which may be further specified for a given accessee device 102. For example, such a request may include assessor device 104 forwarding accessor public key 208 and proof of identity to AE 106.

At Event 742, AE 106 generates credential 126 either independently or in response to the request received via Event 740. For example, if in response to a request, AE 106 may verify the proof of identity supplied by accessor device 104, and may further include accessor public key 208 in the issued access credential 126.

At Event 744, AE 106 issues access credential 126 to accessor device 104.

At Event 746, accessor device 104 receives access credential 126, and generates a message to send to accessee device 102.

At Event 748, through access module 134, accessor device 104 forwards the message, including access credential 126, to accessee device 102. Optionally, the message may include AE credential 123 and/or some reference thereto.

At Event 750, accessee device 102 receives the message and access credential 126, verifies access credential 126, and then generates a response message to verify the identity of accessor device 104. For example, the response message may include a nonce or some other random data, which is transmitted to accessor device 104 at Event 752.

At Event 754, accessor device 104 signs the nonce or random data with accessor private key 518, and sends this information back to accessee device 102 at Event 756.

At Event 758, accessee device 102 decrypts the signed nonce or random data with accessee public key 519, for example, which was included in the verified access credential 126. If the decrypted nonce or random data matches the original nonce or random data from Event 750, then accessee device 102 has proof of the identity of accessor device 104 and further exchange can occur. If there is no match, then the identity of accessor device 104 is not verified, and access to device resources will not be allowed.

At Event 760, accessee device 102 sends accessor device 104 a message confirming the proof of identity or denying confirmation.

At Event 762, if the identity of accessor device 104 is proven, then interaction with one or more device resources 103 may occur according to one or more access privileges 107 within verified access credential 126.

It should be noted that after an initial identity verification and approval of access credential 126, further access attempts may be carried out after performing some portion of the above process relating to the proof of identity, e.g. the access credential may not need to be re-submitted every time.

Thus, this aspect of the method allows accessee device 102 to confirm that it is dealing with the proper accessor device 104 who was issued access credential 126. It should be noted, however, that other methods may be utilized to confirm the identity of accessor device 104.

Figure 11:
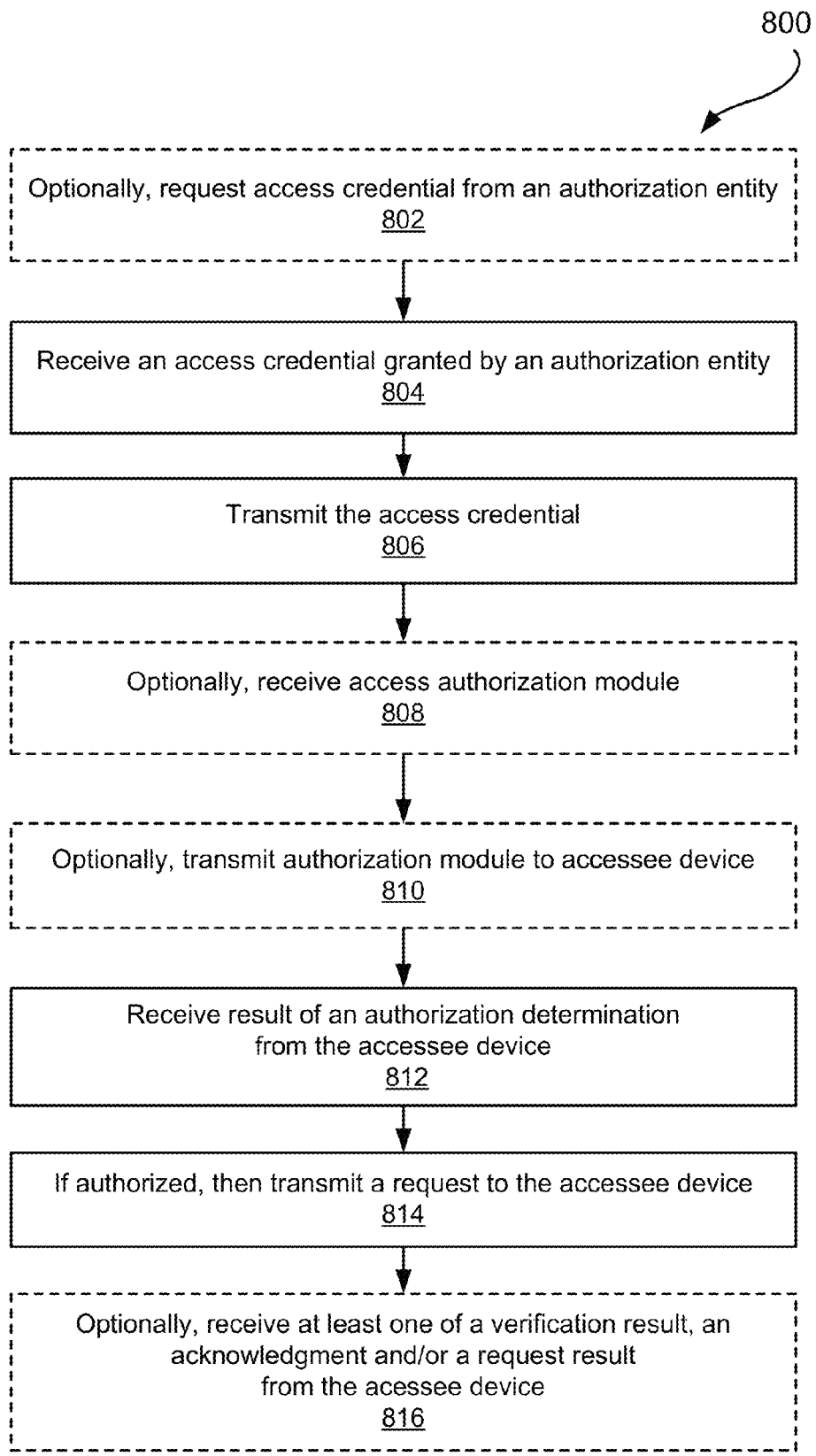
FIG. 11 is a flow chart of one aspect of a method operable on a client computing device according to the system of FIG. 1.

Referring to FIG. 11, a flow diagram is provided for a method 800 of obtaining, at an accessor device, access to accessee device resources. It should be understood that the listed ordering of acts is for the sake of explanation, and such acts may occur in any order. At optional Event 802, a request is made to an authorization entity for access credentials. The authorization entity may be a master AE, or a subordinate AE having authority/privileges delegated from the master. The request may additionally include additional accessor device-related information, such as, password and/or passcode, data identifying accessor device 104, data identifying one or more accessee devices 102, and/or data identifying desired actions to perform each respective accessee device. The request for access credentials is an optional event, because in some aspects access credentials may be communicated to the accessor device without the need to transmit a request.

At Event 804, an access credential is received, such as an access credential granted by an authorization entity. As previously noted the access credential may be received in response to a request or AE 106 and/or authorization infrastructure 304 may unilaterally grant and issue access credential 126 to accessor device 104. Alternatively, AE 106 may pre-load one or more access credentials on a device. Also, alternatively, an access credential identifier may be received instead of the actual access credential. The access credential may include one or more access privileges and an AE digital signature used by the accessee device in authenticating the access credentials. At Event 806, the access credential, and optionally the respective AE credential or a reference thereto, is transmitted, such as for purposes of attempting access to the accessee device. For example, in one aspect, communication is established with accessee device 102, such as via network 110 and/or connection 122, and access credential 126 is forwarded to accessee device 102 in an attempt to gain access to one or more of the plurality of device resources 103 of accessee device 102. The communication that is established may be with respect to a predetermined one of a plurality of communication interfaces 414 (FIG. 6) of accessee device 104, which may be relevant to whether or not access is granted. Alternatively, at Event 806, the access credential identifier may be transmitted instead of the actual access credential.

At optional Event 808, an authorization module may be received from an authorization entity. For example, in some aspects the accessee device 102 may not already have access authorization module 124 for evaluating the received access credential 126, and if accessor device 104 is not pre-loaded with an access authorization module 124, accessor device 104 may receive this module, for example from AE 106 and/or from authorization infrastructure 304. In turn, at optional Event 810, the authorization module may be transmitted to the accessee device 102. In alternate aspects, the authorization module may be communicated to the accessee device 102 directly from the AE 106 or from authorization infrastructure 304. As previously noted, the authorization module may be received by the accessee device at any point in time prior to validating access credentials and not necessarily in the order discussed above. For example, prior to transmitting access credential 126, accessor device 104 may learn that accessee device 102 desires access authorization module 124, and thus accessor device 104 may transmit the module prior to, or along with, the transmission of the credential.

At Event 812, the result of the access authorization is received. The result of the access authorization will either indicate that authorization has been granted, granted in part or that authorization has been denied. If the access credential authorization has been granted or granted in part then, at Event 814, a request 111 (FIG. 6) to interact/access may be generated and transmitted to the accessee device 102. For example, user inputs may be received, via communications module 508 (FIG. 6), representative of a requested action 428 (FIG. 6) in order to generate request 111.

At optional Event 816, a request result 434 (FIG. 6) and/or an acknowledgment may be received. Request result 434 may include information related to the processing of requested action 428 by a respective one of the plurality of device resources 103. For example, request result 434 may identify one or any combination of the action requested, one or more of the plurality of device resources 103 associated with the interaction, and/or a result of the requested action.

Figure 12:
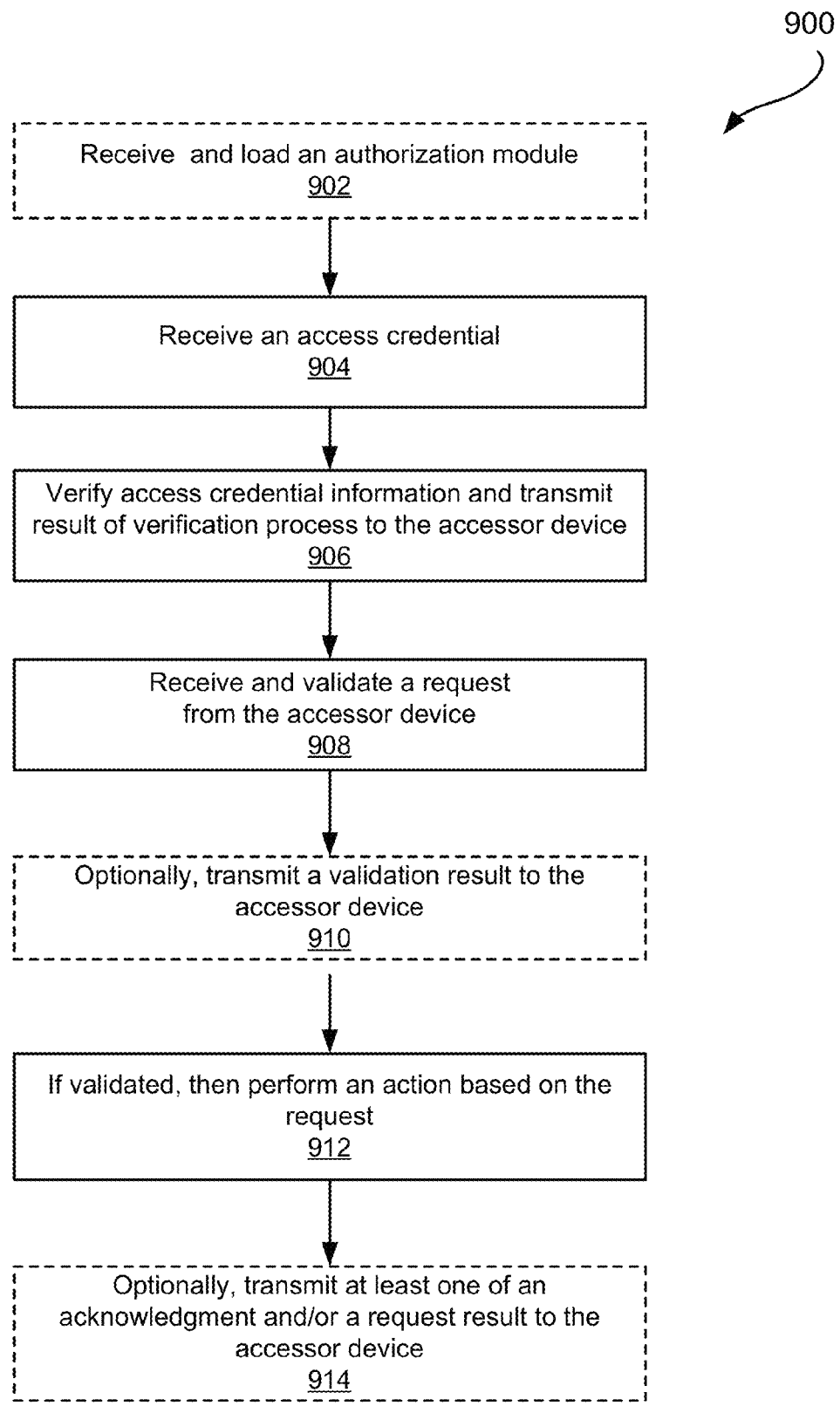
FIG. 12 is a flow chart of one aspect of a method operable on an access device according to the system of FIG. 1.

Referring to FIG. 12, a flow diagram is provided for a method 900 of granting device resource access at an accessee device, according to one aspect. At optional Event 902, an authorization module is received and loaded. As previously noted, the authorization module may be communicated from accessor device 104, AE 106 or any other networked device at any point in time prior to authorizing access credentials. In alternate aspects, the authorization module may be preconfigured at the time of manufacture or at the point-of sale.

At Event 904, an access credential is received. At minimum the access credential will include one or more access privileges associated with one or more device resources and a digital signature associated with AE 106. In some aspects, it should be noted that an access credential identifier may be received, and the receiving of the access credential may be based on retrieving the access credential from a location or network device identified in the access credential identifier. At Event 906, the access credential is authorized/verified by, for example, validating the AE digital signature with an AE public key, by verifying the scope of the issued privileges 107 with respect to AE credential 123, and optionally by verifying the identity of accessor device 104, and the results of the authorization are transmitted to the accessor device 104.

Once authorization is granted and a related verification notification 422 (FIG. 6) has been transmitted to the accessor device 104 then, at Event 908, requests 111 (FIG. 6) for access/interaction may be received from accessor device 104 and, subsequently validated. Validation of the request is needed to insure that accessor device 104 is provided access within the bounds of the one or more issued access privileges 107 included in an "authenticated" access credential 126. For example, validation may include referencing access control database 418 (FIG. 6) to compare the interaction/access requested with the one or more device resources 103 with which interaction is allowed based on the one or more issued access privileges 107. At optional Event 910, a validation result may be generated and transmitted to accessor device 104 informing accessor device 104 of the results of the request validation.

At Event 912, once the request for access/interaction has been validated, the requested interaction with the device resource is performed based on the request. Examples of interaction include, but are not limited to, utilizing authorized debugging tools and performing device maintenance functions, such as provisioning and reconfiguration of a wireless device, managing an address book for synchronization utilities, file system access, uploading and/or downloading of content, e.g., pictures, music, ringers, etc., and transferring of data between devices. At optional Event 914, a request result 434 (FIG. 6) or acknowledgement may be generated and transmitted to accessor device 104 in response to request 111. Request result 434 may include information related to the processing of the request for access/interaction. For example, request result 434 may identify one or any combination of the action requested, one or more of the plurality of device resources 103 associated with the interaction, and/or a result of the requested action.

The apparatus and methods disclosed above presents a controlled mechanism for providing an unknown first computing device with privileged access to a second computing device, such as a wireless handset. For example, the apparatus and methods discussed herein may be used to allow the first device with the ability to copy content from the second device for transfer to a new device, and/or to transfer new content onto the second device. Further, for example, the apparatus and methods discussed herein may allow the first device to perform restricted system configuration management functions on the second device. Additionally, for example, the apparatus and methods discussed herein may allow first device to access and manipulate private user data, and/or network configuration data, stored on second device. Further, it should be understood that many other scenarios may be implemented to utilize the authorized access functionality provided by the present apparatus and methods.

The various illustrative logics, logical blocks, modules, processors and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal. Additionally, in some aspects, the steps and/or actions of a method or algorithm may reside as one or any combination or set of codes or instructions on a machine-readable medium and/or computer readable medium, which may be all or part of a computer program product. Further, in some aspects, the steps and/or actions of a method or algorithm may be embodied in one or more modules of one or more processors.

While the foregoing disclosure shows illustrative aspects and/or aspects, it should be noted that various changes and modifications could be made herein without departing from the scope of the described aspects and/or aspects as defined by the appended claims. Furthermore, although elements of the described aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of gaining authorized access to a restricted resource on another device, comprising:
   receiving, at an accessor device, an access credential from an external authorization entity having a trust relationship with an accessee device, wherein the access credential includes at least a modification detection indicator created by the external authorization entity;
   communicating, to the accessee device, at least the access credential and a request to interact with at least one resource on the accessee device; and
   receiving, at the accessor device, a result of an access authentication process that verifies an authenticity of the access credential based on the modification detection indicator created by the external authorization entity and grants or denies the accessor device access to the at least one resource on the accessee device in response to verifying a proof of identity associated with the accessor device based on an accessor public key.

2. The method of claim 1, wherein the received access credential is generated by a subordinate authorization entity having a subordinate credential linked to a master authorization entity credential, and wherein the result of the access authentication process grants the accessor device access to the at least one resource in response to the access authentication process verifying that access to the at least one resource is allowed by at least the subordinate credential and the master authorization entity credential.

3. The method of claim 1, wherein the access credential further comprises at least one access privilege representation that includes a representation of one or more access privileges available to a master authorization entity, wherein the method further comprises receiving a chain of credentials linking the received access credential to the master authorization entity, and wherein the result of the access authentication process grants the accessor device access to the at least one resource in response to the access authentication process verifying that access to the at least one resource is allowed by all of the chain of credentials.

4. The method of claim 3, wherein the chain of credentials comprises a master authorization entity credential and at least one subordinate credential, and wherein the access credential, the master authorization entity credential, and the at least one subordinate credential are received at a same time or at different times.

5. The method of claim 3, wherein the at least one access privilege representation comprises at least one of an actual privilege, a privilege greater in scope than an authorization entity privilege corresponding to the authorization entity, an unknown future privilege, or a privilege based on an organizational function associated with the accessor device.

6. The method of claim 1, wherein the access credential further comprises the accessor public key.

7. At least one processor configured to gain authorized access to a restricted resource on another device, comprising:
   a first module for receiving an access credential from an external authorization entity having a trust relationship with an accessee device, wherein the access credential includes at least a modification detection indicator created by the external authorization entity;
   a second module for communicating, to the accessee device, at least the access credential and a request to interact with at least one resource on the accessee device; and
   a third module for receiving a result of an access authentication process that verifies an authenticity of the access credential based on the modification detection indicator created by the external authorization entity and grants or denies the at least one processor access to the at least one resource on the accessee device in response to verifying a proof of identity associated with an accessor device based on an accessor public key.

8. A non-transitory computer-readable medium, comprising:
   at least one instruction for causing a computer to receive an access credential from an external authorization entity having a trust relationship with an accessee device, wherein the access credential includes at least a modification detection indicator created by the external authorization entity;
   at least one instruction for causing the computer to communicate, to the accessee device, at least the access credential and a request to interact with at least one resource on the accessee device; and
   at least one instruction for causing the computer to receive a result of an access authentication process that verifies an authenticity of the access credential based on the modification detection indicator created by the external authorization entity and grants or denies the computer access to the at least one resource on the accessee device in response to verifying a proof of identity associated with an accessor device based on an accessor public key.

9. A communication device, comprising:
   means for receiving an access credential from an external authorization entity having a trust relationship with an accessee device, wherein the access credential includes at least a modification detection indicator created by the external authorization entity;
   means for communicating, to the accessee device, at least the access credential and a request to interact with at least one resource on the accessee device; and
   means for receiving a result of an access authentication process that verifies an authenticity of the access credential based on the modification detection indicator created by the external authorization entity and grants or denies the communication device access to the at least one resource on the accessee device in response to verifying a proof of identity associated with an accessor device based on an accessor public key.

10. An accessor device for accessing resources on an accessee device, comprising:
    a processor;
    a memory in communication with the processor; and
    an access module stored in the memory and executable by the processor, wherein the access module, when executed on the accessor device, causes the accessor device to:
    receive an access credential from an external authorization entity having a trust relationship with the accessee device, wherein the access credential includes at least a modification detection indicator created by the external authorization entity;

communicate at least the access credential and a request to interact with at least one resource on the accessee device to the accessee device; and receive a result of an access authentication process that verifies an authenticity of the access credential based on the modification detection indicator created by the external authorization entity and grants or denies the accessor device access to the at least one resource on the accessee device in response to verifying a proof of identity associated with the accessor device based on an accessor public key.

11. A method of providing access to resources on an accessee device, comprising:

receiving, from an accessor device, at least an access credential corresponding to the accessor device and a request to interact with at least one resource on the accessee device, wherein the access credential includes at least a modification detection indicator created by an authorization entity having a trust relationship with the accessee device;

executing an access authentication process that verifies an authenticity of the access credential based on the modification detection indicator created by the authorization entity; and transmitting a result of the access authentication process to the accessor device, wherein the result of the access authentication process grants or denies the accessor device access to the at least one resource on the accessee device in response to verifying a proof of identity associated with the accessor device based on an accessor public key.

12. The method of claim 11, wherein the access credential is generated by a subordinate authorization entity having a subordinate credential linked to a master authorization entity credential, and wherein the result of the access authentication process grants the accessor device access to the at least one resource in response to the access authentication process verifying that access to the at least one resource is allowed by at least the subordinate credential and the master authorization entity credential.

13. The method of claim 12, wherein the access credential further comprises at least one access privilege representation that includes a representation of one or more access privileges available to a master authorization entity, the method further comprises receiving a chain of credentials linking the access credential to the master authorization entity, and wherein the result of the access authentication process grants the accessor device access to the at least one resource in response to the access authentication process verifying that access to the at least one resource is allowed by all of the chain of credentials.

14. The method of claim 13, wherein the chain of credentials comprises the master authorization entity credential and at least one subordinate credential.

15. The method of claim 13, wherein the at least one access privilege representation comprises at least one of an actual privilege, a privilege greater in scope than an authorization entity privilege corresponding to the authorization entity, an unknown future privilege, or a privilege based on an organizational function associated with the accessor device.

16. The method of claim 13, further comprising associating the at least one access privilege representation with at least one communication interface, such that interaction with the accessor device in association with the at least one access privilege representation is limited to the at least one communication interface.

17. The method of claim 11, wherein the access credential further comprises the accessor public key.

18. At least one processor configured to provide access to resources on an accessee device, comprising:

a first module for receiving, from an accessor device, at least an access credential corresponding to the accessor device and a request to interact with at least one resource on the accessee device, wherein the access credential includes at least a modification detection indicator created by an authorization entity having a trust relationship with the accessee device;

a second module for executing an access authentication process that verifies an authenticity of the access credential based on the modification detection indicator created by the authorization entity; and a third module for transmitting a result of the access authentication process to the accessor device, wherein the result of the access authentication process grants or denies the accessor device access to the at least one resource on the accessee device in response to verifying a proof of identity associated with the accessor device based on an accessor public key.

19. A non-transitory computer-readable medium, comprising:

at least one instruction for causing a computer to receive, from an accessor device, at least an access credential corresponding to the accessor device and a request to interact with at least one resource on an accessee device, wherein the access credential includes at least a modification detection indicator created by an authorization entity having a trust relationship with the accessee device;

at least one instruction for causing the computer to execute an access authentication process that verifies an authenticity of the access credential based on the modification detection indicator created by the authorization entity; and at least one instruction for causing the computer to transmit a result of the access authentication process to the accessor device, wherein the result of the access authentication process grants or denies the accessor device access to the at least one resource on the accessee device in response to verifying a proof of identity associated with the accessor device based on an accessor public key.

20. A communication device, comprising:

means for receiving, from an accessor device, at least an access credential corresponding to the accessor device and a request to interact with at least one resource on the communication device, wherein the access credential includes at least a modification detection indicator created by an authorization entity having a trust relationship with the communication device; and means for executing an access authentication process that verifies an authenticity of the access credential based on the modification detection indicator created by the authorization entity; and means for transmitting a result of the access authentication process to the accessor device, wherein the result of the access authentication process grants or denies the accessor device access to the at least one resource on the communication device in response to verifying a proof of identity associated with the accessor device based on an accessor public key.

21. An accessee device for providing access to resources, comprising:

a processor;

at least one device resource in communication with the processor;

a memory in communication with the processor; and an access authorization module stored in the memory and executable by the processor, wherein the access authorization module comprises an access authorization process, and wherein the access authorization module, when executed on the accessee device, causes the accessee device to:
  receive, from an accessor device, at least an access credential corresponding to the accessor device and a request to interact with at least one resource on the accessee device, wherein the access credential includes at least a modification detection indicator created by an authorization entity having a trust relationship with the accessee device;
  execute an access authentication process that verifies an authenticity of the access credential based on the modification detection indicator created by the authorization entity; and
  transmit a result of the access authentication process to the accessor device, wherein the result of the access authentication process grants or denies the accessor device access to the at least one resource on the accessee device in response to verifying a proof of identity associated with the accessor device based on an accessor public key.

22. A method for authorizing an external accessor device to interact with resources on an accessee device, comprising:
  generating an access credential at an authorization entity having a trust relationship with the accessee device, wherein the access credential includes at least a modification detection indicator created by the authorization entity; and
  communicating the access credential to the external accessor device, wherein the access credential authorizes the external accessor device to the accessee device and allows interaction with at least one resource on the accessee device based on an access authentication process that verifies at least an authenticity of the access credential based on the modification detection indicator created by the authorization entity to determine whether to grant or deny the external accessor device access to the at least one resource on the accessee device in response to verifying a proof of identity associated with the external accessor device based on an accessor public key.

23. The method of claim 22, wherein the generated access credential is generated by a subordinate authorization entity having a subordinate credential linked to a master authorization entity credential, and wherein the access authentication process grants the external accessor device access to the at least one resource in response to the access authentication process verifying that access to the at least one resource is allowed by at least the subordinate credential and the master authorization entity credential.

24. The method of claim 22, wherein the access credential further comprises at least one access privilege representation that includes a representation of one or more access privileges available to a master authorization entity, the method further comprises attaching a chain of credentials linking the received access credential to the master authorization entity, and wherein the access authentication process grants the external accessor device access to the at least one resource in response to the access authentication process verifying that access to the at least one resource is allowed by all of the chain of credentials.

25. The method of claim 24, wherein the chain of credentials comprises a master authorization entity credential and at least one subordinate credential.

26. The method of claim 24, wherein the access credential further comprises a validity indicator corresponding to the at least one access privilege representation, and wherein the validity indicator defines at least one of a valid time period, a use-based restriction, a location-based restriction, a device state-based restriction, or a communications interface restriction for the at least one access privilege representation.

27. The method of claim 24, wherein the at least one access privilege representation comprises a privilege based on an organizational function associated with the external accessor device.

28. The method of claim 24, further comprising restricting usage of the access credential based on an association between at least one communication interface associated with the accessee device and at least one of the at least one access privilege representation or the at least one resource.

29. At least one processor configured to authorize an external accessor device to interact with resources on an accessee device, comprising:
  a first module for generating an access credential at an authorization entity having a trust relationship with the accessee device, wherein the access credential includes at least a modification detection indicator created by the authorization entity; and
  a second module for communicating the access credential to the external accessor device, wherein the access credential authorizes the external accessor device to the accessee device and allows interaction with at least one resource on the accessee device based on an access authentication process that verifies at least an authenticity of the access credential based on the modification detection indicator created by the authorization entity to determine whether to grant or deny the external accessor device access to the at least one resource on the accessee device in response to verifying a proof of identity associated with the external accessor device based on an accessor public key.

30. A non-transitory computer-readable medium, comprising:
  at least one instruction for causing a computer to generate an access credential at an authorization entity having a trust relationship with an accessee device, wherein the access credential includes at least a modification detection indicator created by the authorization entity; and
  at least one instruction for causing a computer to communicate the access credential to an external accessor device, wherein the access credential authorizes the external accessor device to the accessee device and allows interaction with at least one resource on the accessee device based on an access authentication process that verifies at least an authenticity of the access credential based on the modification detection indicator created by the authorization entity to determine whether to grant or deny the external accessor device access to the at least one resource on the accessee device in response to verifying a proof of identity associated with the external accessor device based on an accessor public key.

31. An authorization device, comprising:
  means for generating an access credential at an authorization entity having a trust relationship with an accessee device, wherein the access credential includes at least a modification detection indicator created by the authorization entity; and
  means for communicating the access credential to an external accessor device, wherein the access credential authorizes the external accessor device to the accessee device and allows interaction with at least one resource on the accessee device based on an access authentication process that verifies an authenticity of the access credential based on the modification detection indicator created by the authorization entity to determine whether to grant or deny the external accessor device access to the at least one resource on the accessee device in response to verifying a proof of identity associated with the external accessor device based on an accessor public key.

32. A device for authorizing an external accessor device to access resources on an accessee device, comprising:
a processor;
a memory in communication with the processor;
a credential management module stored in the memory, executable by the processor and including a privilege establishment module that, when executed by the processor, causes the processor to generate an access credential at an authorization entity having a trust relationship with the accessee device, wherein the access credential includes at least a modification detection indicator created by the authorization entity; and
a communication module in communication with the processor that, when executed by the processor, causes the processor to communicate the access credential to the external accessor device, wherein the access credential authorizes the external accessor device to the accessee device and allows interaction with at least one resource on the accessee device based on an access authentication process that verifies an authenticity of the access credential based on the modification detection indicator created by the authorization entity to determine whether to grant or deny the external accessor device access to the at least one resource on the accessee device in response to verifying a proof of identity associated with the external accessor device based on an accessor public key.

33. A method of gaining authorized access to a resource on another device, comprising:
communicating, from an accessor device to an accessee device, an identifier associated with an access credential generated by an external authorization entity having a trust relationship with the accessee device, wherein the access credential includes at least a modification detection indicator created by the external authorization entity; and
receiving, at the accessor device, a result of an access authentication process that verifies an authenticity of the access credential based on the modification detection indicator created by the external authorization entity and grants or denies the accessor device access to the resource on the accessee device in response to verifying a proof of identity associated with the accessor device based on an accessor public key.

34. At least one processor configured to gain authorized access to a resource on another device, comprising:
a first module for communicating, to an accessee device, an identifier associated with an access credential generated by an external authorization entity having a trust relationship with the accessee device, wherein the access credential includes at least a modification detection indicator created by the external authorization entity; and
a second module for receiving a result of an access authentication process that verifies an authenticity of the access credential based on the modification detection indicator created by the external authorization entity and grants or denies the at least one processor access to the resource on the accessee device in response to verifying a proof of identity associated with an accessor device based on an accessor public key.

35. A non-transitory computer-readable medium, comprising:
at least one instruction for causing a computer to communicate, to an accessee device, an identifier associated with an access credential generated by an external authorization entity having a trust relationship with the accessee device, wherein the access credential includes at least a modification detection indicator created by the external authorization entity; and
at least one instruction for causing the computer to receive a result of an access authentication process that verifies an authenticity of the access credential based on the modification detection indicator created by the external authorization entity and grants or denies the computer access to a resource on the accessee device in response to verifying a proof of identity associated with an accessor device based on an accessor public key.

36. A communication device, comprising:
means for communicating, to an accessee device, an identifier associated with an access credential generated by an external authorization entity having a trust relationship with the accessee device, wherein the access credential includes at least a modification detection indicator created by the external authorization entity; and
means for receiving a result of an access authentication process that verifies an authenticity of the access credential based on the modification detection indicator created by the external authorization entity and grants or denies the communication device access to a resource on the accessee device in response to verifying a proof of identity associated with an accessor device based on an accessor public key.

37. An accessor device for accessing a resource on an accessee device, comprising:
a processor;
a memory in communication with the processor; and
an access module stored in the memory and executable by the processor, wherein the access module, when executed by the processor, causes the processor to:
communicate, to the accessee device, an identifier associated with an access credential generated by an external authorization entity having a trust relationship with the accessee device, wherein the access credential includes at least a modification detection indicator created by the external authorization entity; and
receive a result of an access authentication process that verifies an authenticity of the access credential based on the modification detection indicator created by the external authorization entity and grants or denies the accessor device access to the resource on the accessee device in response to verifying a proof of identity associated with the accessor device based on an accessor public key.

\* \* \* \* \*